US009050224B2

(12) United States Patent
Slorance

(10) Patent No.: US 9,050,224 B2
(45) Date of Patent: Jun. 9, 2015

(54) WHEELCHAIRS

(75) Inventor: Andrew Mackay Slorance, Nairn (GB)

(73) Assignee: Carbon Black System Ltd, Nairn (GB)

(*) Notice: Subject to any disclaimer, the term of this patent is extended or adjusted under 35 U.S.C. 154(b) by 111 days.

(21) Appl. No.: 13/821,214

(22) PCT Filed: Sep. 13, 2011

(86) PCT No.: PCT/GB2011/001339
§ 371 (c)(1), (2), (4) Date: Mar. 22, 2013

(87) PCT Pub. No.: WO2012/035295
PCT Pub. Date: Mar. 22, 2012

(65) Prior Publication Data
US 2013/0187355 A1 Jul. 25, 2013

(30) Foreign Application Priority Data
Sep. 14, 2010 (GB) .................................. 1015271.8

(51) Int. Cl.
*B62M 1/00* (2010.01)
*A61G 5/02* (2006.01)
*A61G 5/10* (2006.01)
*A61G 5/12* (2006.01)

(52) U.S. Cl.
CPC ............ *A61G 5/02* (2013.01); *Y10T 29/49826* (2015.01); *A61G 5/028* (2013.01); *A61G 5/10* (2013.01); *A61G 5/1067* (2013.01); *A61G 5/12* (2013.01); *A61G 2005/1054* (2013.01); *A61G 2005/128* (2013.01)

(58) Field of Classification Search
USPC .......................................... 280/304.1, 280.1
See application file for complete search history.

(56) References Cited

U.S. PATENT DOCUMENTS

| | | | | |
|---|---|---|---|---|
| 3,679,257 | A | 7/1972 | Jacuzzi et al. | |
| 4,366,964 | A | 1/1983 | Farey et al. | |
| 4,887,826 | A | 12/1989 | Kantner | |
| 5,028,065 | A | 7/1991 | Danecker | |
| 5,217,239 | A * | 6/1993 | Koet | 280/250.1 |
| 5,480,172 | A | 1/1996 | James | |
| 5,480,179 | A | 1/1996 | Peacock | |
| 5,507,513 | A * | 4/1996 | Peters et al. | 280/250.1 |
| 6,241,321 | B1 | 6/2001 | Gagnon | |
| 6,375,209 | B1 * | 4/2002 | Schlangen | 280/250.1 |

(Continued)

FOREIGN PATENT DOCUMENTS

| | | |
|---|---|---|
| AU | 2005/100037 | 2/2005 |
| DE | 4114710 | 11/1992 |

(Continued)

OTHER PUBLICATIONS

EU Design No. 001834607-0001, I Imagine Ltd., EU Design Application (Wheelchair), filed Mar. 12, 2011.

(Continued)

*Primary Examiner* — Tony Winner
(74) *Attorney, Agent, or Firm* — Knobbe Martens Olson & Bear, LLP

(57) ABSTRACT

The invention relates to a wheelchair for example a wheelchair for an active user, a method of manufacturing a wheelchair and a wheel for a wheelchair. In further aspects the invention relates to a wheelchair, a footrest for a wheelchair, a wheelchair having a light, and a seat back for a wheelchair, a wheelchair that is water resistant.

20 Claims, 21 Drawing Sheets

(56) References Cited

U.S. PATENT DOCUMENTS

| | | | | |
|---|---|---|---|---|
| 6,702,314 | B1 | 3/2004 | Crose | |
| 7,360,840 | B2 * | 4/2008 | Barlow et al. | 297/423.26 |
| 7,841,611 | B2 * | 11/2010 | Ivanchenko | 280/250.1 |
| D664,489 | S | 7/2012 | Slorance | |
| 2004/0084870 | A1 | 5/2004 | Ward et al. | |
| 2005/0006871 | A1 | 1/2005 | Goding et al. | |
| 2007/0012526 | A1 | 1/2007 | Holub | |
| 2012/0080246 | A1 * | 4/2012 | Engman et al. | 180/65.1 |

FOREIGN PATENT DOCUMENTS

| | | |
|---|---|---|
| EP | 1714629 | 10/2006 |
| FR | 2700726 | 7/1994 |
| GB | 2427674 | 1/2007 |
| GB | 2448688 | 10/2008 |
| GB | 2458852 | 10/2009 |
| JP | 7304302 | 11/1995 |
| JP | 11347072 | 12/1999 |
| NL | 9401066 | 2/1996 |
| WO | WO 2004/108046 | 12/2004 |
| WO | WO 2007/099565 | 9/2007 |

OTHER PUBLICATIONS

EU Design No. 001916131-0001, I Imagine Ltd., EU Design Application (Wheel), filed Sep. 12, 2011.

AbleData, X-Core 3 wheel, available at http://www.abledata.com/abledata.cfm?pageid=19327&top=14565&ksectionid=19327&productid=80408&trail=0&discontinued, accessed Aug. 4, 2010.

The Independent, Trekinetic—Reinventing the wheelchair, available at www.independent.co.uk/life-style.gadgets-and-tech/features/trekinetic-reinventing-thewheelchair-858190.html, accessed Aug. 4, 2010, article date Jul. 2, 2008.

Panthera X Technology, Wheelchair, available at http://www.panthera.se/index-eng.html, accessed Aug. 30, 2010.

Future Chair, Free Spirit: The World's Lightest Wheelchair, available at http://www.gizmag.com/worlds-lightest-wheelchair/9272/, accessed Sep. 4, 2013, article dated May 12, 2008.

Progeo Carbon Fibre NOIR Wheelchair, available at http://www.rehateamprogeo.com/?PAG=3&SEZ=57&MOD=43&LANG=EN, accessed Sep. 5, 2013.

* cited by examiner

Section cut B-B
Scale: 1:1

WHEELCHAIRS

The invention relates to a wheelchair for example a wheelchair for an active user, a method of manufacturing a wheelchair and a wheel for a wheelchair. In further aspects the invention relates to a wheelchair, a footrest for a wheelchair, a wheelchair, bicycle, pram or push chair having a light, a seat back for a wheelchair and a wheelchair that is water resistant.

BACKGROUND

Wheelchair users may be active or passive wheelchair users. Active wheelchair users tend to manage the movement of their wheelchair and its assembly and disassembly when required, for example loading and unloading to and from a car, independently. Passive wheelchair users may also be relatively independent but rely upon a third party for movement and/or assembly/disassembly of wheelchair from time to time.

Many wheelchairs are adapted for the comfort of a user having seat bases and seat backs made from material slung between two parallel struts. This may be supplemented by foam filled cushions which both support and provide comfort to a user. Some wheelchair such as wheelchairs designed for sports may have rigid seat bases and seatbacks to provide firm supports that a user push against when using the push rims on wheels to drive the wheelchair forward or when reaching for a ball.

One difficulty faced by wheelchair users is that of transfer from the seat base of the wheelchair to another seat, such as the chair or a car seat. Typically, wheelchairs have two front support struts at the sides of the wheelchair one on either side of a user's legs. These side support struts lead down to a footrest for supporting the feet as well as supporting the seat base on front wheels. These support struts get in the way when trying to transfer from one seat base to another. Thus, the seat base of the wheelchair cannot be brought close to the seat base of another chair or a car seat because the side support struts are in the way.

Many wheelchairs are of box frame construction having a seat base supported at front and rear ends by downwardly supporting members and one or more cross struts extending from the front to the rear between the downwardly supporting members forming a box shape when viewed from the side. Other wheelchair designs are of a cantilever type having a seat base supported at front and rear ends by downwardly supporting members and no cross struts or other structural connection between these downwardly supporting members. Thus, in a cantilever design the seat base provides structural strength between the downwardly depending supporting members and so to the overall frame, whereas in a box frame design the one or more cross struts or other structural connection provide structural strength between the downwardly depending support members and so to the overall frame. A box frame design may in addition be provided with structural strength via the seat base, but this is not always the case. Thus, a seat base made of fabric would not offer any structural benefit, whereas a solid seat base may do so. Further, a box frame will offer a more rigid structure than a cantilever frame and is usually lighter than a cantilever frame. Due to a cantilever frame not having cross struts as seen on a box frame, a cantilever frame will usually need to be constructed from thicker and heavier materials. A cantilever frame made from light weight metals such as titanium will suffer from flexion not seen in the box frame design. The benefit of the cantilever frame is that it is more compact for stowage than the box frame.

Foldable wheelchairs are particularly useful for car users because these can be folded (disassembled) for loading and unloading to and from a vehicle. Nevertheless, folding wheelchairs are not ideal as their rigidity is dependent upon the rigidity of the folding joints and clamps when in use. This is also true for wheelchairs having adjustable components such as adjustable side support struts or adjustable front support struts.

A rigid wheelchair, as opposed to one that is foldable or has movable joints, is more energy efficient as energy is not lost from a user's muscles to the wheelchair in flexing the joints when simply trying to move the wheelchair. Thus, a wheelchair designed to have folding and/or adjustable and/or flexible parts to meet a users sizing and comfort needs can soak up the energy that an active wheelchair user would prefer not to expend on such unproductive energy losses.

Further problems faced by the wheelchair users include those of 1) seeing the ground immediately ahead of the wheelchair when it is dark, 2) degradation of the wheelchair and its ease of rotation following exposure to water such as puddles 3) black marks on hands from wheelchairs constructed of aluminium (other metals also leave metallic residue) that are transferred to the user surroundings and can also be slippy to grip when wet.

U.S. Pat. No. 4,887,826 (KNATNER) describes a lightweight foldable wheelchair having first and second struts hingedly mounted to the underside portion of the seat base of the seat. The forward ends of both struts meet below and forward of the seat and secure a demountable castor wheel and hingedly mounted folding footrests.

U.S. Pat. No. 5,480,172 (JAMES) describes a three wheeled competition wheelchair having an adjustable centre of mass. A footrest assembly has two seat support posts having one end movably mounted to the seat frame and an opposite end carrying footplates which is movingly mounted longitudinally along a frame beam. The frame beam extends from a main wheel crossbar of the wheelchair and terminates at a front wheel.

U.S. Pat. No. 5,480,179 (PEACOCK) describes a collapsible wheelchair having an L-shaped monocoque chassis extending between a main wheel crossbar and a footrest.

GB2427674 (SCARSI) describes a wheelchair armrest pad incorporating a lighting unit having three LEDs in an armrest. AU2005100037 (ZHANG) discloses a wheelchair headlight positioned in a joystick control of a wheelchair. U.S. Pat. No. 6,702,314 (CROSE) describes a wheelchair lighting system having a plurality of light assemblies coupled to the handles of the wheelchair.

U.S. Pat. No. 3,679,257 (JACUZZI) describes a foldable wheelchair. The three wheeled wheelchair has a solid seat back, the back being hinged for folding down upon the seat, while the side wheel and front wheel assemblies are hingedly secured for folding under the seat, the entire wheelchair in its folded condition being of light weight capable of storage in the trunk of a car.

GB2458852 (SMURTHWAITE) shows a manually driven wheelchair of a standard box type construction.

DE4114710 (BEESE) describes a wheelchair with brakes. US20070012526 (HOLUB) describes a wheelchair having inboard disc brakes. GB2448688 (JCM) describes a wheelchair having a segmented seatback assembly. Two adjustable front seat support struts are shown.

X-core wheels available from Spartak Corporation, Indiana USA are made of carbon fibre with welded hard anodised aluminium hand rims. An all terrain wheelchair available from www.trekinetic.co.uk uses a carbon fibre monocoque seat. British company Future Chairs Ltd, UK and Italian firm Progeo of Italy both produce a carbon fibre model of wheelchair. Swedish firm Panthera also produce a carbon fibre box frame wheelchair.

US2005006871 (GODING) describes an ergonomically designed wheelchair wheel having an integral hand push rim. The wheel may be made from carbon fibre. Nevertheless this design of push rim is poorly suited to manufacture by carbon fibre to provide sufficient strength in use. U.S. Pat. No. 4,366,964 (FAREY) describes a wheelchair hand rim having a cross functional contour conFigured to optimise the gripping surface. JP7304302 (HASHIMOTO) describes a hand rim for a wheelchair wheel. JP11347072 (MASANORI) describes a wheelchair wheel having an outer case and a hand part protruding from it. FR2700726 (DAVID) describes the use of carbon fibre in wheelchairs. U.S. Pat. No. 6,241,321 (GAGNON) describes an all-terrain wheel for a wheelchair having an integral push rim.

Wheelchair design has evolved very little over the last twenty five years. One area of development is in wheelchair materials with choices of aluminium, titanium and alloy being popular. Carbon fibre usage is still very small although it is available in a couple of conventionally styled wheelchairs. Aluminium offers a lightweight material choice with good stiffness but comes with compromises. Aluminium frames are very prone to damage from knocks and scrapes. The need for strength means more material is needed; weight saving benefits are then compromised. Aluminium is not a pleasant material to handle leaving black residue on surfaces it contacts including hands. Titanium has excellent strength to weight properties. However, it is not a stiff material and cantilever frames flex considerably. A frame that flexes does not behave predictably and is less energy efficient. Alloy frames offer stiffness and strength but are heavier than the other metals. The strength, weight and stiffness benefits of carbon fibre are not best utilized in traditional tubular design common in wheelchairs. Furthermore, conventional wheelchair designs have two front stems one either side of the users legs.

Typically, wheelchairs are usually constructed from simple tubular frames fitted with size adjustable upholstery. This method of construction offers the manufacturer an easy means of creating bespoke sizes to suit users dimensions. Made to measure has become standard practice in the high end wheelchair industry. This method of construction throughout the industry has lead to all chairs suffering the same design flaws. Many components are generic across brands continuing a circle of faulty design.

To understand the benefits of the design it is important to grasp four basic needs of the active independent wheelchair user. 1) Weight the weight of a wheelchair is the number one priority for the user when choosing a chair. A lightweight chair not only makes for easier pushing by the user, it makes for easier lifting. An independent user will frequently have to collapse and lift their chair in and out of a vehicle. 2) Styling: Users demand a chair that looks good and as much as possible compliments their own style. Independent wheelchair users want to look good and not be seen as users of ugly medical devices. In an exemplary embodiment the wheelchair will use F1 technology and look as good as it performs. 3) Performance: our end user is the kind of individual that knows no boundaries. They will take their chair into every conceivable environment and expect it to perform. The wheelchair is a workhorse and an unavoidable extension of themselves. It should not be unreasonable for a user to want to paddle in the sea, take their chair through sand, mud, snow, over dirt tracks or gravel, through the woods or grass. Energy efficiency and minimal rolling resistance are key qualities a demanding user looks for. The user of exemplary embodiments of wheelchair according to the present invention will be preserving their joints and energy from unnecessarily heavy pushing and lifting in comparison to users of conventional chairs. A good chair will have a rigid frame (not a folding frame) with quick release wheels and a folding backrest. These elements will give a durable compact chair for rough usage and compact stowage. 4) Frame shape: A modern wheelchair will be compact in use and dismantle for easy storage. For storage purposes it is standard that the main wheels are fitted with quick release axles and that the backrest folds flat to rest face down on the seat.

The shape of the frame is itself important. Cantilever designs offer the most compact and versatile shape. The clear space underneath the cantilever compared to the box frame design makes for easy maneuverability when lifting the frame into a car, passing it between user and steering wheel. Although heavier than the box frame, once in the car the cantilever frame takes up less space. An ideal design would offer the rigidity, strength and weight of the box frame with the compactness of the cantilever design.

One problem with the conventional two stem design is that the stems prevent the user getting their body close to surfaces for transfers. This is a particular problem for car transfers. The car door sill contacts the chair and stops the user getting themselves close for easy transferring. The user will have to make a transfer from their wheelchair over the gap between door sill and car seat. Many users will use transfer boards to bridge large gaps. The user will slide along the board from wheelchair to car, bed, toilet etc.

Most light weight wheelchairs weigh around 10 kg when fitted with wheels, tyres, brakes and upholstery. Some chair manufacturers make claims of under 7 kg, but often this is the weight of their smallest size of chair in its minimal configuration.

Conventional backrest designs are made up of two vertical poles fitted with a fabric sling and upholstery between them. After a short amount of time the post tops tear through the upholstery and the sling fabric stretches. The user soon suffers pressure points as the exposed vertical posts dig into their back. Sling upholstery moves when the user pushes forward, therefore a proportion of the users energy is being lost by the absorption of the fabric. A flimsy generic folding mechanism used across most wheelchair brands to fold the backrest often fails and comes loose. The height of conventional sling backrests can be adjusted to suit the user. However, adjusting the height requires the removal of the upholstery and using tools to extend telescopic poles.

A conventional wheelchair uses a telescopic footrest secured at a desired height with a bolt. Adjusting the height with such a design requires tools, and for the user to be out of the wheelchair. This awkward system means that once the footrest is initially set up it is very rarely changed. However, there are circumstances when easy fine adjustment of the footrest would be very useful. Sometimes, a conventional wheelchair has a height adjustable footrest that is independent of the front wheels. Foot position is important to how comfortably the user sits and is fundamental to keeping good balance. When a user wears different shoes or goes bare foot their feet will no longer sit on the footrest in the perfectly correct position. As the initial set up would have been done wearing shoes, going bare foot will mean the users feet are at least 10 mm higher than the footrest 10 mm is enough to cause considerable discomfort and balance problems with the feet not sitting firmly flat on the footrest. Changing from training shoes with thick rubber soles into dress shoes with less grip and a thinner sole can result in feet sliding off the footrest.

Other situations such as wet weather, bumpy surfaces and muscle spasms can also cause feet to slip off the footrest.

Using a wheelchair in the dark is a hazardous activity. Unlike an able bodied individual walking across an unpredictable surface, a wheelchair user can't feel the ground under foot. It is not until the small front castors wheels hit an object that the user knows of the hazard, by which time it may be too late. Falls from wheelchairs are often the result of the small front wheels becoming jammed on a stone or pot hole, stopping the chair instantly. The chair will often tip forward and the user fall out the front. It is virtually impossible for a wheelchair user to push their chair and carry a torch at the same time. Moving safely in the dark is a very difficult, slow and precarious exercise.

Wheels and push rims account for approx 5 kg of a wheelchairs weight. Conventional wheelchairs use bicycle wheels with modified hubs and bolted on push rims. Push rims are traditionally made from aluminium tubing and are very inefficient for gripping and pushing the chair. A user will commonly grip the tyre rather than the push rim in order to get sufficient grip. In wet weather the aluminium push rims are impossible to grip for slowing and steering the chair. Aluminium push rims also leave the user with scrapes and black residue over their hands and around their home where the push rim has contacted a surface. Doors, door frames, sink pedestals, toilets and white goods etc all get damaged. Wheelchairs cause considerable damage around the home and to the user's car with chipped paint, torn and oil damaged interiors.

Wheelchairs typically have twelve sets of steel sealed bearings, namely 2×2 each main wheel, 2×2 each front wheel, 2×2 each castor housing. Twelve sets of steel bearings add a considerable weight to the wheelchair and cause other difficulties. The reliance on lubricant is a problem for the wheelchair user. A wheelchair should be able to enter any environment the user requires. However, lubricant is easily washed away leaving the user with a squeaking unresponsive chair. Taking a wheelchair through snow and foul weather will strip the oil from the front axles. Even using the shower in a luxury hotel can result in embarrassing squeaky wheels. A user would not normally sit in their wheelchair when in the shower, but they do need to get to the shower and keep their chair near to them to leave again. Most hotels have fold down seats for the guest to use within a wheel in shower. The hot soapy spray that inevitably covers the waiting wheelchair when using this seat strips it of oil around the axles and bearings. When the quick release wheels on conventional wheelchairs are removed for stowing the chair in a car, the oil covered axle is left exposed. The axles leave oil on everything they touch, hands, clothes, car interior etc. Ceramic bearings alone will not remove the need for lubricant on the axles. Although the wheels will rotate on lubricant free ceramic bearings, lubricant will be needed to slide the axle in and out of its port on the chair.

The chair will need the capability of carrying weight while dropping of kerbs, being lifted up steps, usage on uneven ground and various surface materials. Going up and down kerbs is a fundamental need for the independent user. To achieve this, the chair should always go up or down the kerb in a straight line so both wheels encounter the kerb together. However, sometimes it is not possible to operate in a straight line. A user waiting for a ramp to get off a train may be let down and have to drop off a 12" step on their back wheels. Impacts are also a serious consideration. A user will use the front edge of the footrest to push open heavy doors by simply bashing into them. If the door is locked or is a pull not a push door this can result in a hard impact. As far as wheels are concerned we have similar issues to consider. A user will bunny hop their chair to get around tight corners, roll up and down kerbs and turn 360 on soft surfaces putting a twisting strain on the wheel. Simple variations in tyre pressure will cause very different stresses when turning 360.

Wheelchairs users in the high end market demand made to measure chairs that fit their proportions and are set up for their specific needs. One wheelchair size will not fit all users, therefore to avoid introducing adjustable mechanisms that reduce rigidity and add weight, the invention seeks to provide a method of manufacturing to address this. Seat width, seat depth and leg length are the key measurements that must be tailored to individual user needs. Exemplary embodiments of the present invention may achieve multiple sizes and configurations without producing individual tooling for each customer, or producing a generic size adjustable wheelchair that will be heavy.

Standard wheelchair brakes operate on a leverage system that presses against the tyres of the main wheels. The problem with these brakes is that they are dependent on tyre pressure and wheel position to operate effectively. Therefore, the brake itself must be position adjustable along the edge of the seat to find the perfect leverage. Even when the perfect position is found it will not be long before the tyre deflates a little and the brake no longer works. It is a common injury for users to trap their thumbs between the moving wheel and braking arm lever when pushing the chair. A further common injury is trapping thumbs or fingers between the moving wheel and moving push rim.

The present invention and its several aspect seeks to alleviate one or more of the problems outlined above.

SUMMARY OF INVENTION

In a first aspect of the invention there is provided a wheelchair comprising: a seat base for supporting a user; a single front stem rigidly attached to a front end of the seat base; the seat base and front stem forming a frame of a cantilever-type having an L-shape when viewed from the side; and further wherein the single front stem is rigid and consists of a first unitary component.

In a second aspect of the invention there is provided a wheelchair comprising a frame having at least one light, the light may be located at or near a lower part of the frame. The wheelchair may comprise a seat base and front stem forming a frame of a cantilever-type having an L-shape when viewed from the side.

In a third aspect of the invention there is provided a wheel comprising a wheel rim and a push rim and the push rim is integrally formed with the wheel rim. In a fourth aspect of the invention there is provided a wheelchair comprising such a wheel.

In a fifth aspect of the invention there is provided a wheelchair comprising a footrest, the footrest comprising a rotatable footrest plate and an associated locating mechanism for locating the plate at a rotated position. In a sixth aspect of the invention there is provided a carbon fibre footrest for a wheelchair and a wheelchair comprising such a footrest.

In a seventh aspect of the invention there is provided a wheelchair comprising a frictionless bushing for receiving an axle pin or an axle.

In an eighth aspect of the invention there is provided a wheelchair that is water resistant and/or waterproof.

In a ninth aspect of the invention there is provided a wheelchair comprising a seatback having a lower seatback portion and an upper seatback portion movable with respect to one another and arranged so that the lower and upper seatback portions can overlap one another. The back rest may be removable via a quick release mechanism.

In a tenth aspect of the invention there is provided a method of manufacturing a wheelchair comprising forming the front stem, forming the seat base and bonding the front stem to the base.

In an eleventh aspect there is provided a bicycle or a child's pushchair or a child's pram or a wheelchair having at least one light comprising at least one light pipe. The light pipe may for example comprise at least one optical fibre. The light pipe may terminate to provide light emitting from an end thereof. The light pipe may be located within one or more components such as a handle(s), handle bar, seat, seat stem, front stem, front or back wheel mount (such as a front or back wheel fork). The light pipe may terminate at an end located in a surface of one or more of these components. Any one or more of these components may be formed from carbon fibre and have the light pipe located therein. The light pipe may be moulded therein, for example in a single carbon fibre structure or may be located by bonding two (or more) carbon fibre parts about the light pipe. The light pipe may be flexible.

In a twelfth aspect of the invention a method of manufacture is provided comprising:—providing one or more moulds for a wheelchair and one or more spacer insert for the moulds, inserting a spacer insert into the mould and moulding a carbon fibre wheelchair component. The component may be a front stem and/or a seat base, and/or a footrest and/or a seat back, or one half of a front stem and/or a seat base, and/or a footrest and/or a seat back. The spacer insert allows the size of the mould to be adjusted. This is particularly useful for the seat base and front stem to allow these to be sized to a user's requirements.

In a thirteenth aspect of the invention there is provided a bicycle or a pushchair or a pram or wheelchair having at least one light arranged to illuminate the ground in front of the bicycle, pushchair, pram or wheelchair. The light may comprise one or more LEDs. There may be at least two LEDs one on either side of the bicycle, pushchair pram or wheelchair. There may be two or more LEDs on each side of the bicycle, pushchair pram or wheelchair. The illumination from the at least one LED may be in a direction forwards and slightly downwards so as to illuminate the ground in front of the bicycle, pushchair pram or wheelchair. The one or more LEDs may be mounted in a frame, for example within a moulded component forming the frame, of the bicycle, pushchair pram or wheelchair. The LEDs may be mounted in a portion of the surface of the frame, the portion of the surface of the frame being sloped in a direction towards the ground during use so as to illuminate the ground in front of the bicycle, pushchair pram or wheelchair. Alternatively or in addition, LEDs (or light pipes where these are provided) may be mounted at an angle with respect to a portion of surface the frame so that the LEDs (or lightpipes) point towards the ground. For example, an adhesive bonding material that sets hard may be used to angle the LEDs (or light pipe ends) with respect to a portion of the surface of the frame so that the LEDs (or light pipes) point towards the ground.

The at least one LED may be powered via one or more wires moulded into the frame. In a wheelchair, such as a manual or electric wheelchair, LEDs may be provided in the foot rest. Where a wheelchair according to the first aspect is provided one or more wires may be provided in the front stem to power one or more LEDs near or adjacent a lower part of the footrest. In a further preferred embodiment, at least one LED is provided in a side portion of a footrest having an open frame shape. The side portion may have a surface facing forwardly and downwardly (in one example embodiment only slightly downwardly) so that the at least one LED in use illuminates the ground below and in front of the wheelchair. Preferably two or more LEDs are provided in each side portion of a footrest having an open frame shape.

A battery for the at least one LED may be placed underneath the seat. Where mounted components for a frame are provided, the wire(s) may be provided within the moulded components. Typically the LEDs do not protrude beyond the surface of the frame. Typically the at least one LED is mounted within recesses within the frame. Thus, in one or more embodiments, the wires are hidden from view and the LEDs are mounted in recesses in the surface of the frame therefore providing a more visually appealing, ergonomically sound bicycle, pushchair pram or wheelchair.

Any one or more of the variations described in the following example embodiments may be used in any one or more of the above aspects of the invention.

In an example embodiment the seat base consists of a (second) unitary component. In an example embodiment the first unitary component forming the front stem is permanently attached to the second unitary component forming the seat base to form a (third) unitary component comprising the frame of cantilever-type having an L-shape when viewed from the side. In an example embodiment the front stem is permanently bonded to the seat base.

In an example embodiment at least an upper part of the front stem lies rearward of a front edge of the seat base. In an example embodiment at least a lower part of the front stem lies rearward a front edge of the seat base. In an example embodiment the first unitary component comprising the front stem lies rearward of a front edge of the seat base. In an example embodiment the front stem lies rearward of a front edge of the seat base.

In an example embodiment the front stem is of monocoque construction. In an example embodiment the front stem comprises or is carbon fibre. In an example embodiment the front stem is Y-shaped when viewed from the front. In an example embodiment the front stem is Y-shaped when viewed from the side. In an example embodiment the front stem comprises a region of uniform cross-section. In an example embodiment the front stem comprises a triangular cross-section. In an example embodiment the front stem is non-folding. In an example embodiment the front stem is non-adjustable. In an example embodiment the front stem is of fixed pre-determined length. In an example embodiment the front stem comprises 2 or more sub components permanently attached theretogether to form the first unitary component.

In an example embodiment the seat base is rigid. In an example embodiment the seat base is of monocoque construction. In an example embodiment the seat base comprises or is carbon fibre.

In an example embodiment the front stem has one or more front wheels at a lower end thereof. Where two or more wheels are provided these may be spaced apart, for example, at a distance wider than width of the seat base and/or at a distance narrower than the distance between the axes of rotation of the main wheels. In an example embodiment a footrest is provided at a lower end of the front stem for supporting feet. In an example embodiment the footrest consists of a (fourth) unitary component. In an example embodiment the footrest provides a mounting for one or more front wheels. In an example embodiment the footrest is rigid. In an example embodiment the footrest is of monocoque construction. In an example embodiment the footrest comprises or is carbon fibre. In an example embodiment the fourth unitary component forming the footrest is permanently attached to the first unitary component forming the front stem. In an example embodiment the footrest is permanently bonded to the front stem. In an example embodiment the uppermost surface of the footrest has a height above the ground of around half or less the height of a main wheel axis of rotation above the ground. In an example embodiment, an uppermost surface of the footrest, forward of a front edge of the seat or forward of a frontmost part of a main wheel, is at a height above the ground of around half or less the height of a main wheel axis of rotation above the ground. In an example embodiment the footrest has an open frame shape comprising one or more side portions connecting a front portion for supporting feet thereon and a rear portion for receiving ankles. In an example embodiment the front portion and at least part of the side portions are lower in height above the ground being around half or less of the height of a main wheel axis of rotation above the ground. In an example embodiment the height is approximately or exactly 4.0, 4.5, 5.0, 5.5, 6.0, 6.5, 7.0, 7.5, 8.0 inches.

In an example embodiment the seat base comprises at least one handle. In an example embodiment at least one handle is provided at each of one or more front corners of the seat base.

In an example embodiment one or more main wheels are provided and a front edge of the seat base and/or a handle on the seat base extends forwardly beyond a periphery of the wheel.

In an example embodiment at least one light is located at or near a lower part of the front stem. In an example embodiment the at least one light comprises at least one light source. In an example embodiment a footrest is provided and at least one light is located in the footrest. In an example embodiment at least one light source is located remotely and light is directed to a lower part of the front stem from the remotely located at least one light source. In an example embodiment the at least one light comprises at least one light pipe for directing light to a lower part of the front stem from the remotely located at least one light source. In an example embodiment at least one light pipe is located within the front stem and/or within the footrest and/or within the seat base. In an example embodiment at least one light source is located adjacent the seat base. In an example embodiment at least one light pipe directs light to at least one exit point in a footrest at a lower part of the front stem. In an example embodiment at least one light pipe is provided comprising at least one optical fibre. In an example embodiment at least one light source comprises at least one LED.

In an example embodiment a wheelchair is provided comprising at least one main wheel. In an example embodiment of any aspect of the invention the main wheel comprises a wheel rim forming a (fifth) unitary component. In an example embodiment the at least one main wheel is of monocoque construction. In an example embodiment at least one main wheel comprises or is carbon fibre. In an example embodiment at least one main wheel comprises one or more spokes. The spokes may be formed of carbon fibre and may also be integrally formed with a wheel rim. In an example embodiment the spokes are integrally formed with the wheel rim to form the (fifth) unitary component. In an example embodiment a centre-line of each spoke lies off centre so as not to intersect with the axis of rotation of the wheel. In an example embodiment at least one wheel comprises a push rim. In an example embodiment the push rim is integrally formed with the wheel rim to form a (fifth) unitary component. In an example embodiment the push rim has a trapezoidal cross-section forming at least first and second and optionally third hand engaging surfaces. In an example embodiment the first hand engaging surface is at an obtuse angle to the second hand engaging surface. In an example embodiment the second hand engaged surface is at an angle of 90° or less to the third hand engaging surface.

In an example embodiment the footrest comprises a rotatable footrest plate and an associated locating mechanism for locating the plate at a rotated position. In an example embodiment the locating mechanism comprises a friction hinge and/or a friction fit and/or a snap fit mechanism. The friction hinge may be suitably stiff to hold the weight of a user's feet in position. In an example embodiment the rotating plate comprises a recess for access to rotate the plate.

In an example embodiment a wheelchair is provided comprising a frictionless bushing for receiving an axle pin or an axle. In an example embodiment an axle pin housing having a frictionless bushing and at least one main wheel provided with a highly polished spigot. In an example embodiment the bushing comprises Nylon or PTFE or Delrin or Phosphor Bronze and/or the axle pin or axle comprises titanium and/or stainless steel.

In an example embodiment the wheelchair is water resistant and/or waterproof. In an example embodiment there is provided a wheelchair comprising a (first) unitary component forming a front stem and either or both of a (second) unitary component forming a seat base and a (third) unitary component forming a footrest, the unitary components being rigidly and permanently bonded together so as to be water-resistant and/or waterproof. In an example embodiment at least one light pipe molded into the footrest and/or front stem and/or seat base and at least one light source located remotely from the lower part of the front stem, the light pipe having an exit for light from the wheelchair at or near the lower part of the front stem. In an example embodiment one or more main wheels have ceramic bearings. Ceramic bearings may also be used, for example located in the footrest, for rotation of front wheel forks with respect to the footrest.

In an example embodiment a seatback is provided having a lower seatback portion and an upper seatback portion movable with respect to one another and arranged so that the lower and upper seatback portions can overlap one another. In an example embodiment the lower seatback portion and upper seatback portion are each provided with respective telescoping lower and upper telescoping portions to enable movement therebetween. In an example embodiment a front surface of the lower seatback portion and a front surface of the upper seatback portion are arranged so as to provide a continuing support surface for a user's back.

In an example embodiment, a seat back is provided hingedly connected (for example by a hinge) to the seat base for folding the seat back to a position adjacent to the seat base.

The front wheel forks may depend from the footrest and/or may be formed from carbon fibre. In an example embodiment the front stem is substantially vertical during use. The angle of the seat back may also be adjustable to achieve vertical, reclined or inclined seat back position with respect to the seat base. This is useful when seat dump is added that may angle the seat back rearwards.

In an example embodiment the method of manufacture comprises forming a footrest and bonding the footrest to the front stem. In an example embodiment the method comprises forming a front stem having a region of uniform cross-section, removing a portion of the region of uniform cross section. In an example embodiment the method comprises forming a front stem, cutting it in half in the region of uniform cross-section, removing a portion of the region of uniform cross section and joining the two parts together. In an example embodiment, the method comprises forming a front stem in two portions, trimming one or both portions to size for example in a region of uniform cross section and joining the two portions together.

One objective of an exemplary embodiment of the present invention is to provide a daily use wheelchair that can be produced to the different sizes and specifications users need. In an exemplary embodiment the wheelchair is designed so each component is as light as possible and best serves its function. In an exemplary embodiment the wheelchair is designed so that specialist upholstery will be used to fit 3D spacer fabric to backrest. Different foam types may be used for comfort and weight. In an exemplary embodiment the wheelchair is designed so that the front wheels fit under a car door sill and facilitate easy transfers. In an exemplary embodiment the wheelchair is designed so strength and weight issues are optimized. For example, a carefully calculated amount of carbon fibre may be used to assure strength and stiffness. In an exemplary embodiment the wheelchair of the present invention may comprises one or more of the following:—fully carbon fibre, mono cantilever frame, low castor housing, no tools simple comfort adjustability, angle and height adjustable backrest, single tool needed for advanced adjustments, LED forward illumination, full carbon fibre wheels with integral moulded push rims, full ceramic bearings, unique brake design, open backrest design, breathable airflow upholstery, kind to property and user, axle protectors/oil free axles or axle pins.

One or more exemplary embodiments of the invention will seek to provide a daily use wheelchair that is light and versatile. One exemplary embodiment provides a wheelchair that is almost entirely constructed from carbon fibre. The present inventor has appreciated that carbon fibre offers outstanding weight to stiffness qualities. A stiff cantilever design can successfully be achieved without compromising on weight saving. The present invention aims to provide in one exemplary embodiment a wheelchair of weight around 6 kg fully fitted adult size. Carbon fibre allows for the structure to be made to differing strengths throughout the design saving weight in areas that require less strength. The ability to mould and bond parts together means there is very little need for extra fixings. One or more exemplary embodiments of the invention will have a full carbon fibre frame with a combination of core materials. Honeycomb and Rohacell (lightweight foam) may be used in areas under extensive strain or prone to impact, while less vulnerable areas may be hollow. The use of carbon also allows for the aesthetic moulding and joining of components to create a visually attractive chair with few if any sharp corners or edges that may tear car upholstery when stowed. Exemplary embodiments of the present invention in which carbon fibre is used will reduce damage to the home and car paint.

In an exemplary embodiment the wheelchair is designed so that the sitting and leg position are correct. In an exemplary embodiment the wheelchair is designed so that the quick release and adjustable parts are user friendly. In an exemplary embodiment the wheelchair is designed so that wheel camber, seat dump, leg length etc are adjustable during manufacture to provide different user setups. In an exemplary embodiment the wheelchair provides push rims and/or lubricant free axles or axle pins.

One aspect of the present invention seeks to provide a method of manufacturing by creating a carbon fibre wheelchair that fully exploits the benefits of composites.

In an exemplary embodiment, the mono front stern sits behind the users legs making for a very compact frame shape. The unique mono frame design of the wheelchair of the present invention solves or eases the transfer problem. Combined with very low rise castors the mono frame will allow the user to get themselves seat edge to seat edge with their car seat. The low rise castor housing will fit underneath a standard car door sill, yet will still feature 5" or 4" front wheels as is standard on most conventional chairs. With the front wheels under the car the user can push a wheelchair according to the present invention close up to the car seat without any obstructions. The user will then be able to make an easy, seat to seat transfer without the need to cross a large gap.

Exemplary embodiments of the present invention take a radical new approach to seating and comfort. The seat and backrest are made from carbon fibre monocoque design with the seat forming an important element of the frame structure. These rigid parts will offer the user better energy efficiency over conventional sling upholstery designs. Stiffness is an important quality of exemplary embodiments of the present invention, stiffness and lightweight equals energy efficiency.

Lightweight wheelchairs are designed for maximum mobility not for comfort. However, exemplary embodiments of the present invention provide a lightweight backrest that allows the user to choose their backrest height at will, without tools. Using a simple over centre lever design similar to that found on a bike seat post the user can raise or lower the top section of backrest. A low backrest is desirable when the user is active and wants the backrest out of the way and not restricting their mobility. A higher back offers more support and comfort for long static periods at a desk or watching TV.

Further to the height adjustment the backrest on present invention also has optional angle adjustment mechanism. However, unlike conventional wheelchair designs the backrest does not fold and is instead entirely removable via a quick release mechanism. A benefit of the removal of the backrest is for compact stowage. More importantly the weight of the chair for lifting into the car by the user may be divided—Main frame as one part and the main wheels and backrest as a second part with the heaviest part, the main frame weighing approximately 3 kg. Avoiding the use of a hinge, the backrest will be robust and solid to lean against. The quick release used will be a modified steering wheel quick release as used in F1 or other motorsports.

In an exemplary embodiment, the open design of the backrest serves a number of purposes. The cut-outs save weight and serve as grab points for helper assistance. The cut-outs offer air circulation, particularly useful to users in a hot climate.

Exemplary embodiments of the present invention produce multiple different sizes of wheelchair without different tooling for each configuration. One method of producing different seat sizes in composite would be to have spacers that insert into the tool. When inserted, the spacers widen the mould and therefore widen the resulting part. Removing the spacers narrows the mould therefore narrows the part produced.

BRIEF DESCRIPTION OF THE FIGURES

The invention will now be described in more detail with reference to the following Figures in which like reference numerals refer to like features.

DETAILED DESCRIPTION OF THE DRAWINGS

Figure 1:
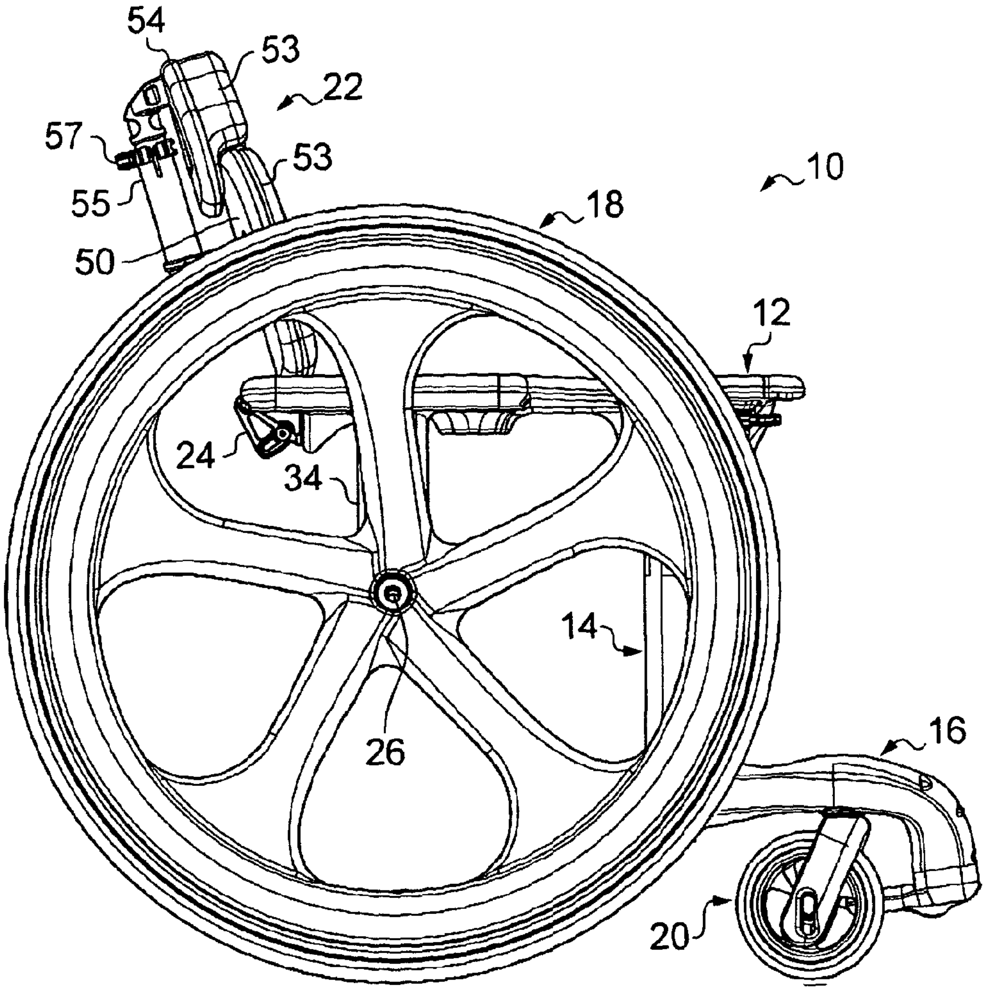
FIG. 1 shows a side elevation view of a wheelchair according to the invention.

FIG. 1 shows a wheelchair 10 having a seat base 12, front stem 14, front footrest 16 and main wheels 18. Front stem 14 depends from the underneath of seat base 12 at a front end of seat base 12. Front stem 14 is located at a front end of seat base 12. Thus front stem 14 may be located forwardly of a midpoint of seat base 12 or in preferred embodiments at a forward third or at a forward quarter of seat base 12. Front footrest 16 is provided with one or more front wheels 20. Seat 12 is supported by main wheels 18 via seat support struts 34 and by front wheels 20 via front stem 14 and footrest 16. Thus main wheels 18 and front wheels 20 provide a support footprint on the ground for the wheelchair. In this exemplary embodiment there are four wheels and the foot print will be four sided. This presents some advantages as will be discussed in relation to FIG. 2. If three wheels are provided, the support footprint is three sided. The extent of the footprint with respect to the centre of gravity of the wheelchair with a user is seated in it determines the stability of the wheelchair. Thus if the centre of gravity extends past the footprint provided by the wheelchair the wheelchair may topple over. Seat base 12 is attached to a seatback 22 by an adjustable hinge 24. A lower seat back portion 50 and an upper seat back portion 54 are provided. One or both of these may be made from carbon fibre. Typically, both are each formed from one moulded carbon fibre part fronted by upholstery 53 mounted thereon. Seat base 12 is typically made from two carbon fibre component halves, each from one mould which are then joined together, for example to form a seam running generally parallel to a major surface of the seat base 12. A telescoping mechanism 55 and an over centre lever clamping mechanism 57 are provided to the rear of seat back 22.

Figure 2:
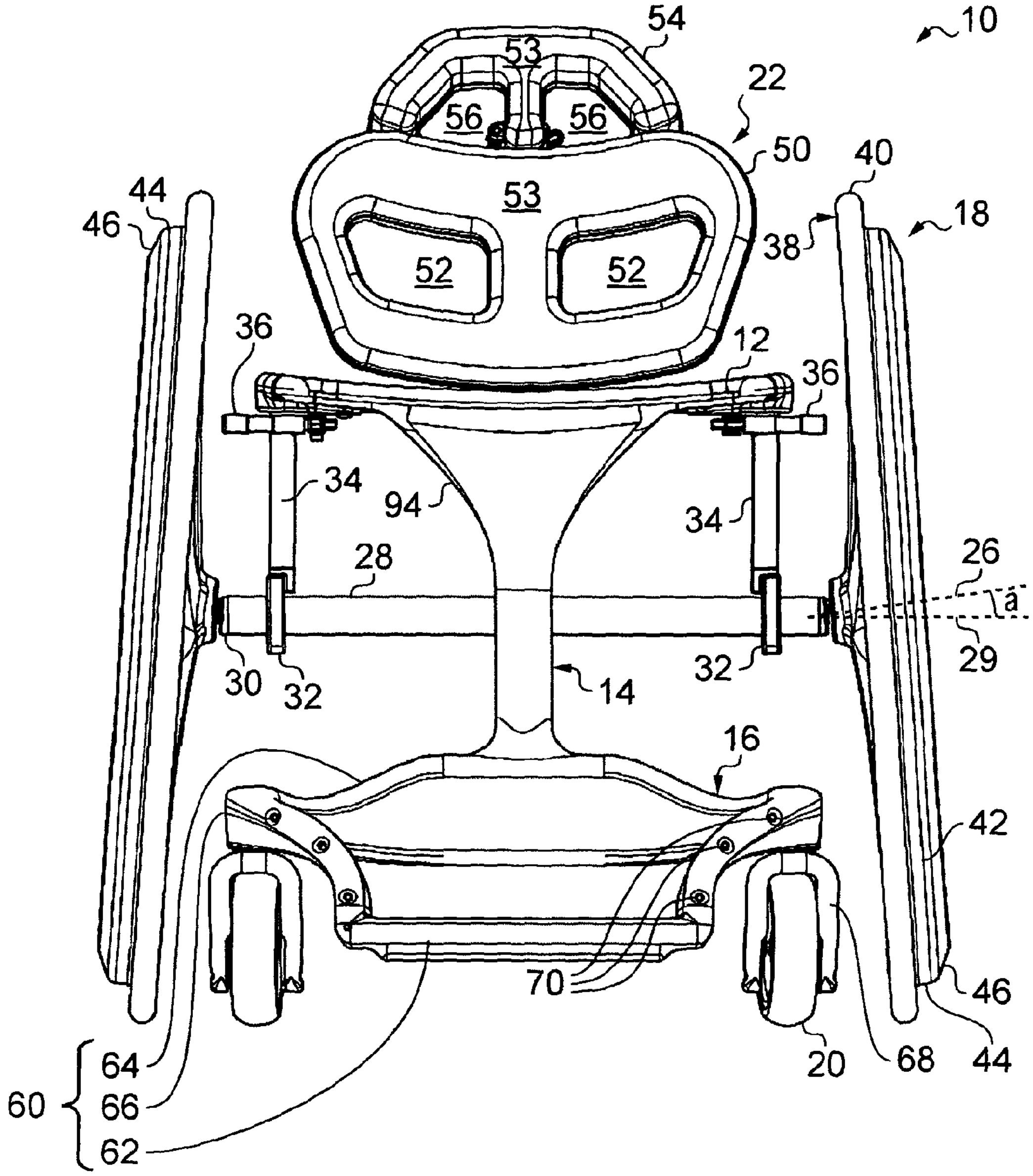
FIG. 2 shows a front elevation of view of a wheelchair according to the invention.
Figure 3:
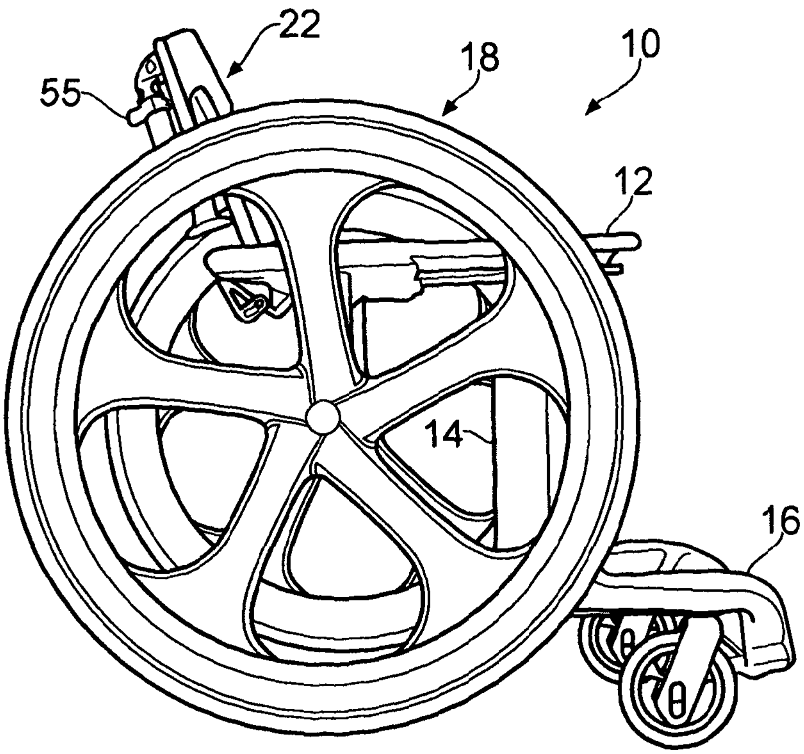
FIG. 3 shows a side perspective view of the wheelchair according to the invention.

Referring now to FIG. 2, wheelchair 10 is provided with a seat base 12 having a single front stem 14 fixedly attached thereto. Stem 14 is Y-shaped having a wider upper portion attached to seat base 12 and a narrower lower portion attached to footrest 16. Footrest 16 is fixedly held in relation to front stem 14. Footrest 16 comprises a footrest frame 60 having lateral extent in two directions. Thus footrest 16 has a footrest front portion 62 a front rest rear portion 64, and front rest side portions 66. Extending below footrest side portions 66 are front wheel forks 68 for mounting front wheels 20 spaced apart thereon. Footrest 16 may be carbon fibre. Front wheel forks may be carbon fibre. A crossbar 28 defines a crossbar axis 29. Main wheels 18 rotate at a slight angle with respect to true vertical, i.e. at a camber angle (such as angle “a”) if desired by a user. Camber angle “a” may be up to 8 degrees. Therefore, a main wheel axis of rotation 26 can be defined having an angle “a” with respect to generally horizontal crossbar axis 29. Two spaced seat support struts 34 support seat base 12 on crossbar 28 via crossbar clamps 32. One or more lights 70, such as lights pipes or light emitting diodes (LEDs), are shown in front facing surface of footrest 16. These lights illuminate the ground at the base of the wheelchair.

In this example embodiment the wheels 20 are spaced apart and, as shown here, may be located at the outermost lateral extent of the footrest 16 in positions approximately in alignment with the seat support struts 34 when seen from the front or indeed may be slightly further apart. Thus, the front of the wheelchair has a support footprint provided by the front wheels 20 that is of around the same lateral extent as that of seat base 12, or perhaps slightly wider. As can also be seen in FIG. 2, the lateral position of wheels 20 is slightly inward of the axles of main wheels 18. These arrangements add to the stability of the design of the wheelchair having a single front stem since it makes it more difficult for a wheelchair user to move so as to position the centre of gravity of the wheelchair and user combined beyond the periphery of the support footprint.

Crossbar 28 is provided with axle pin housing 31 (not shown) having an axle pin housing entrance 30. Axle pins (not shown) are fixed onto the centre of wheels 18 and, if camber is desired by a user in use, are thus located at a slight angle with respect to the axis of crossbar 28 by means of axle pin housings. Main wheels 18 are provided with a tyre 40 and an inwardly facing wheel rim surface 38. Main wheel 18 is also provided with an outwardly facing circumferential first hand engaging surface 44 which is generally horizontal at the top of the wheel 18. An outwardly facing circumferential second hand engaging surface 46 is also provided adjacent first hand engaging surface 44. Second hand engaging surface 46 is at an angle to the horizontal at the top of the wheel.

Seatback 22 has a lower seatback portion 50 having lower seatback cut-outs 52 therein and an upper seatback portion 54 having upper seatback cut-outs 56 therein. Corresponding cut-outs are provided in upholstery 53. Seatback cut-outs 52 and 56 reduce the amount of material required for seatback 22 and therefore contribute to the lightness of the chair whilst also adding to the stiffness by reducing the uninterrupted surface of the seat back portions with transverse curved surfaces that extend in a generally transverse direction to the plane of the major surfaces of the upper and lower seat back portions. Similarly, curved peripheral walls found at the edges of upper and lower seat back portions 50 and 54 add to the stiffness of the seat back portions 50, 54. In addition, the provision of upper seat back cut-outs 56 in upper seat portion 54 enables upper seat back portion 54 to be used as a handle, if necessary.

Referring now to FIGS. 3, 4, 5 and 6, various perspective views of a wheelchair according to exemplary embodiment(s) of the invention are shown. In these Figures, seat 12, front stem 14 and footrest 16 are made from carbon fibre. Again, in these particular embodiments, the carbon fibre is coloured black. Also, in this particular embodiment, seatback 22 is made from carbon fibre. Telescoping mechanism 54 may be formed from telescoping carbon fibre tubes. Preferably, main wheels 18 are also formed from carbon fibre and are provided with an integrally moulded push rim 42 as will be detailed in more detail later.

Figure 4:
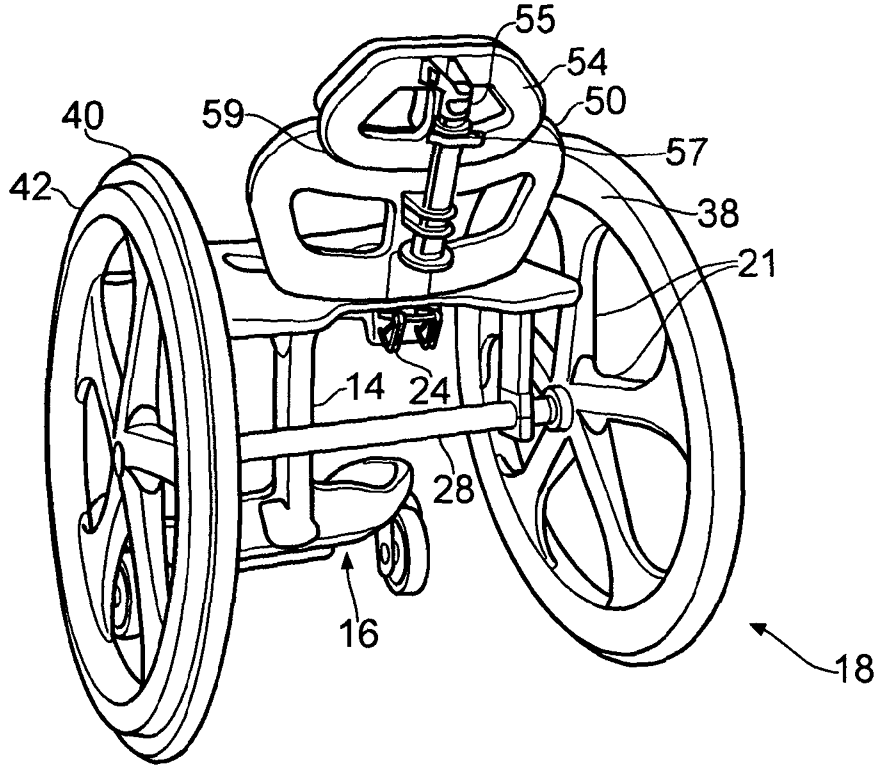
FIG. 4 shows a rear perspective view of a wheelchair according to the invention.

Turning now to FIG. 4 in more detail, main wheels 18 are provided with a tyre 40, push rim 42 (which is integrally moulded with the wheel rim (not visible)) and spokes 21. Here, five spokes are provided and although fewer or more spokes may be provided within the scope of this invention, typically 3 or 5 or 7 spokes are used. Wheel rim surface 38 is used for braking by brakes 36. The profile of main wheel 18 is very flat on the user side of the wheel as seen in FIG. 4 so as to prevent avoid any inadvertent injury to a user. Similarly, the outer side main wheels 18 is also very smooth even in the region of push rim 42 as will described in more detail later.

Figure 5:
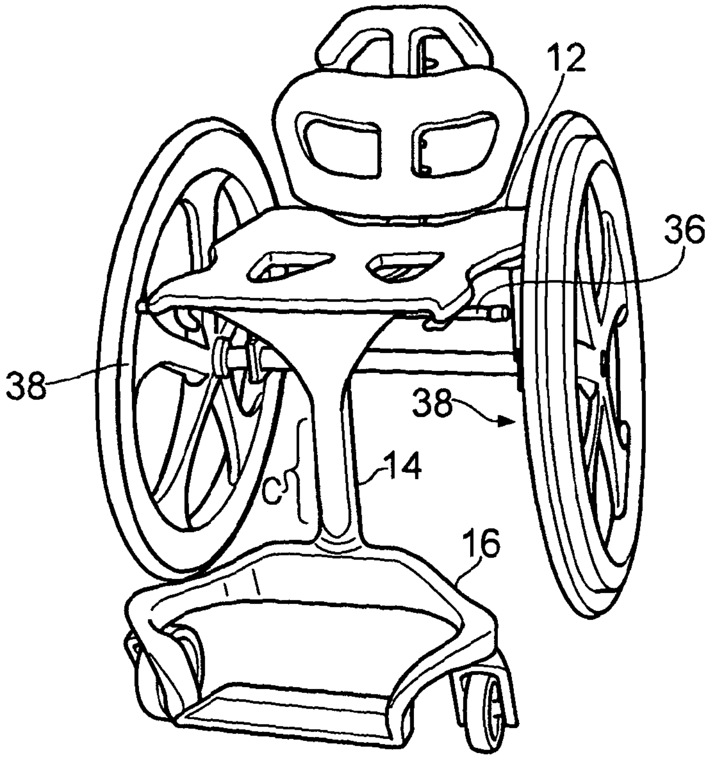
FIG. 5 shows a front perspective view of a wheelchair according to the invention.

Turning now to FIG. 5, brakes 36 can be seen either side of seat base 12 for engagement with inwardly facing wheel rim surface 38. A single front stem 14 and a footrest 16 can also be seen in more detail. It is anticipated that seat base 12 and front stem 14 and optionally footrest 16 will each be formed as unitary components, for example, moulded of carbon fibre as individual units. Alternatively, single front stem 14 may be formed in two pieces and then joined together for example by bonding to form an integral unitary component. Thus, in one example embodiment, front stem 14 is moulded in two pieces, an upper front stem portion and a lower front stem portion, and these are bonded together to form a unitary component. One or both portions of the front stem may be shortened, for example by trimming or cutting, typically in a region of uniform cross section C, so as to shorten the overall length of the front stem when assembled together. The integral unitary components may then be joined, for example by bonding, together to form an overall rigid unitary component comprising at least the front stem 14 and in example embodiments one or both of the seat base 12 and footrest 16.

Figure 6:
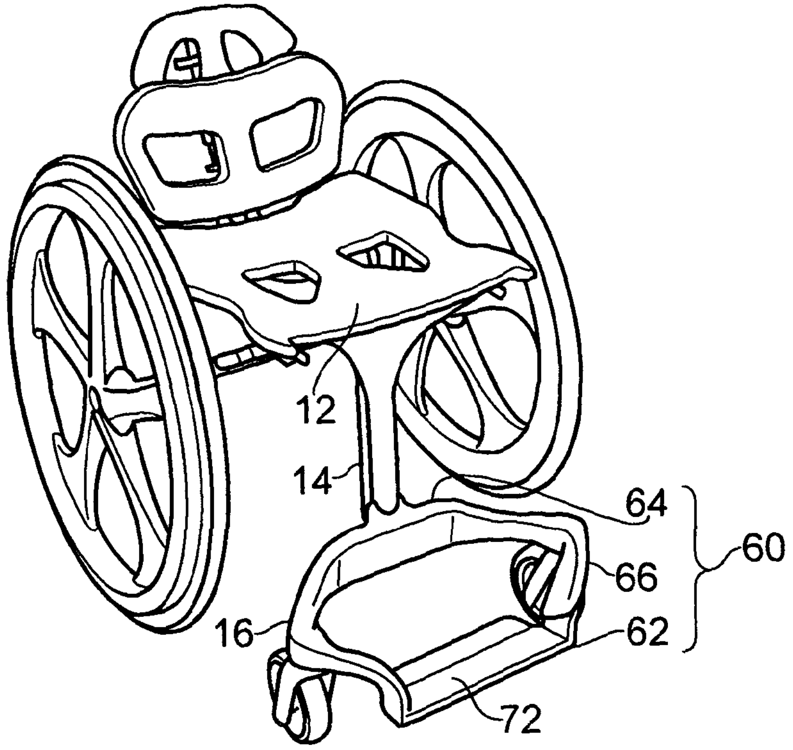
FIG. 6 shows a front perspective view of a wheelchair according to the invention.
Figure 27A:
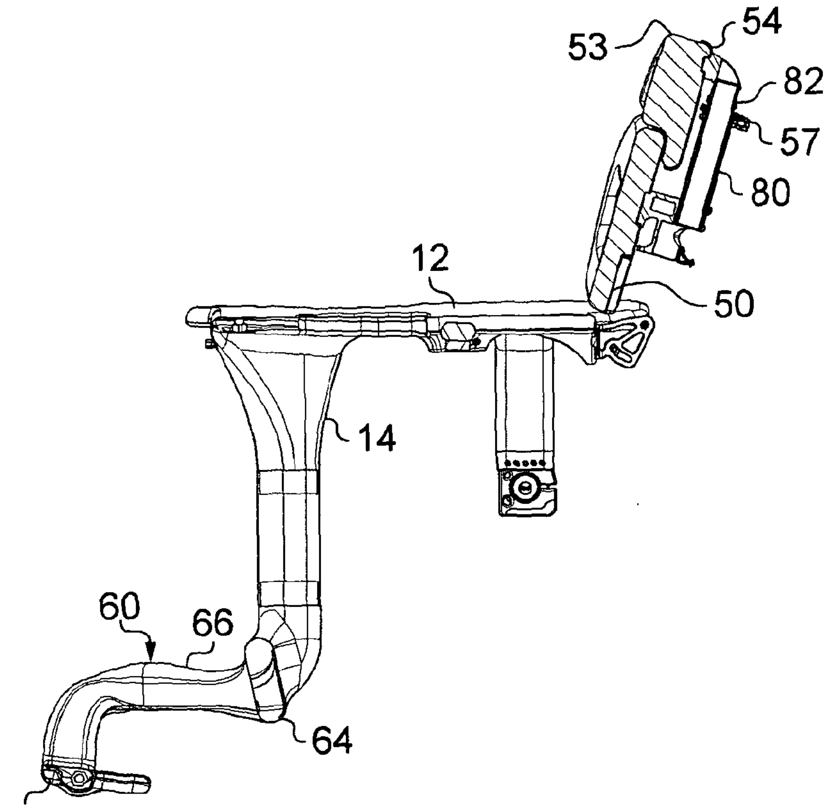
FIG. 27A shows a cross-sectional side view through wheel chair frame according to an example embodiment of the invention.
Figure 27B:
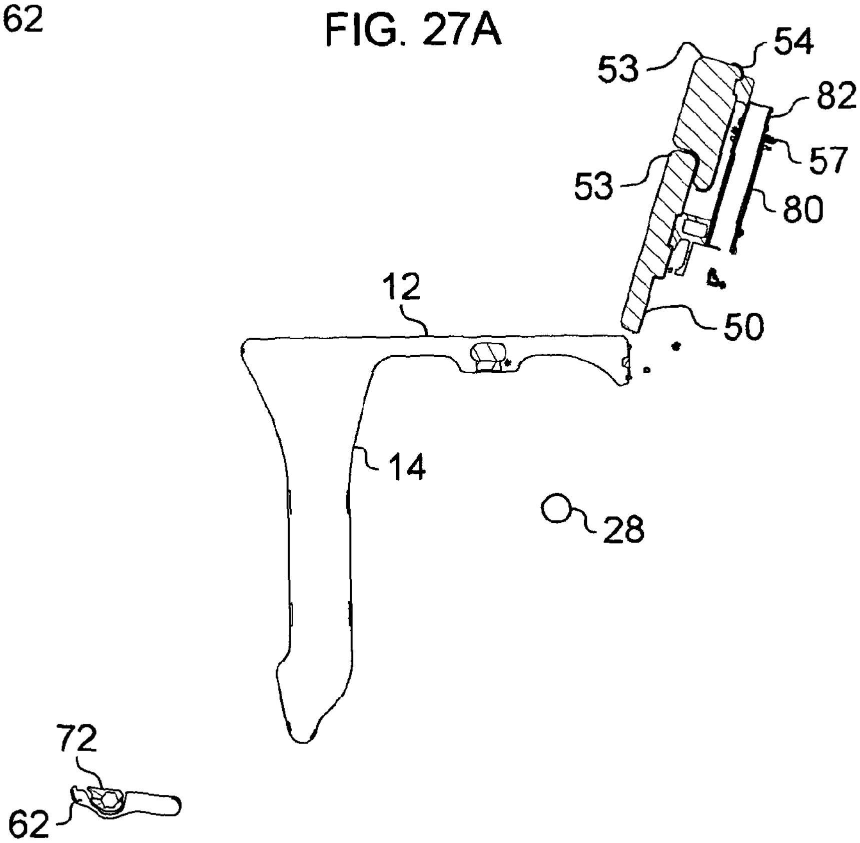
FIG. 27B shows the cut surfaces in the cross section of FIG. 27A.

Furthermore, as can be seen especially in FIGS. 5 and 6, the outer skin of outer surface of seat base 12, front stem 14 and footrest 16 are moulded to provide a continuously varying smooth outer surface. This avoids any unnecessary step changes in the surface which could cause irritation to a user or damage to his belongings or surroundings. In addition, as will be seen later, the nature of the construction in terms of carbon fibre provides a very strong, very rigid structure despite having several bonded seams. The bonding used may be 3M 9323. Typically the components such as seat base 12 and front stem 14 are hollow once bonded as shown in FIGS. 27A and 27B and more specifically in FIG. 27B. A rigid wheelchair and in particular a rigid wheelchair frame such as that provided by seat base 12, stem 14 and footrest 16 is optimal for energy efficiency on the part of the user and therefore desirable for the active wheelchair user.

Turning now specifically to FIG. 6, footrest 16 is provided with a footrest frame 60 having a front footrest portion 62, a rear footrest portion 64 and side footrest portions 66 for mounting front wheels thereon. Footrest frame 60 is overall very low and as will be described hereinafter rear footrest portion 64 is also very low and typically lies behind the frontmost edge of seat base 12. A footplate 72 is provided in front footrest portion 62. The front wheels are widely spaced being positioned at side portions of the open footrest frame 60. Widely spaced front wheels provide more stability. Indeed widely spaced front wheels situated forward of the front edge of the seat base is desirable as this provides stability against both side and forward tipping. A low open frame footrest for mounting widely spaced front wheels thereon, the frame also having a rear portion which lies behind rearward of the front edge of the wheel base is particularly useful in facilitating transfers, yet forming a stable wheelchair.

Figure 7:
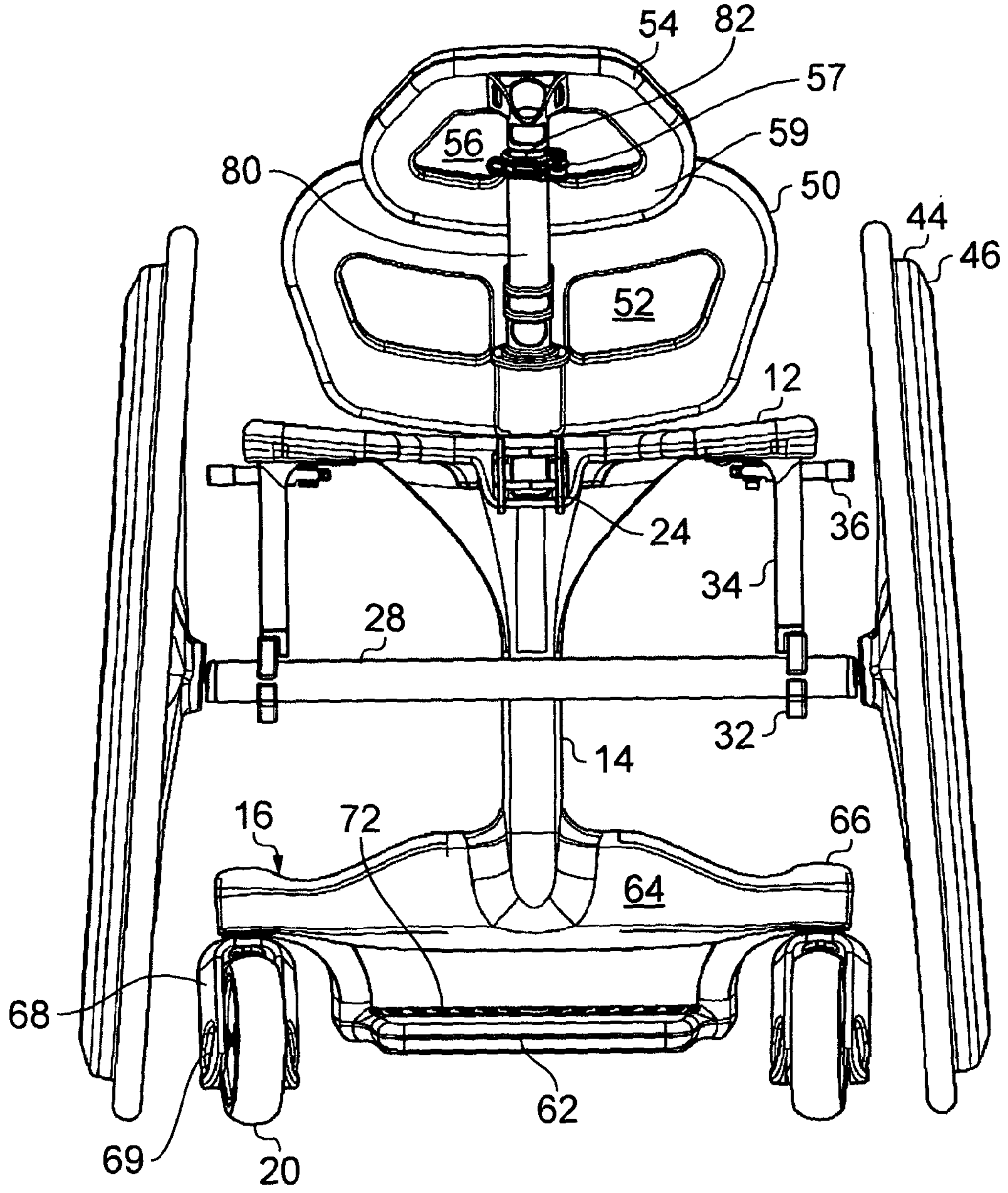
FIG. 7 shows a rear elevation view of a wheelchair according to the invention.

Turning now to FIG. 7, a lower seatback portion 50 is provided with a lower telescoping portion 80 fixedly connected to it. Upper seat back portion 54 is provided with an upper telescoping portion 82 fixedly connected to it and telescopically mounted with respect to lower telescoping portion 80. An over-centre lever clamping mechanism 57 is provided to clamp upper and lower telescoping portions 82 and 80 theretogether so as to fixedly clamp lower and upper seatback portions 50 and 54 in relation to one another. In FIG. 7, the upper seat back portion 54 is in its lowermost position and overlaps the lower seatback portion 50 in a region 59. It can also be seen in FIG. 7 that front stem 14 is Y-shaped when viewed from the rear.

Turning to footrest 16, footrest side portion 66 has front wheel forks 68 provided on swivelling hinges (not shown). The axes of wheels 20 are mounted in front wheel adjustment slots 69. This enables the final position of front wheels 20 to be altered slightly. It will be noted in FIG. 7 and later Figures that front wheel adjustment slots 69 are at an angle with respect to front wheel forks 68 so as to provide both up and down and lateral adjustments. Footrest plate 72 can also be seen. It is also of note that the uppermost surface of footrest 16 lies somewhere around the middle of the distance between crossbar 28 and the ground. Thus, when a 26 inch wheel is provided the uppermost part of footrest 16 is probably around 6.5 inches. Typically, the footrest rear portion 64 has a height above the ground of around half the distance between the wheel tyre and the crossbar 28 say around 6 to 6.5 inches. The uppermost surfaces of front and side footrest portions 62 and 66 respectively are lower than the rear footrest portion 64 and may typically lie around 4 to 5 inches above the ground. Typical front wheel diameters are around 3, 4 or 5 inches.

Figure 8:
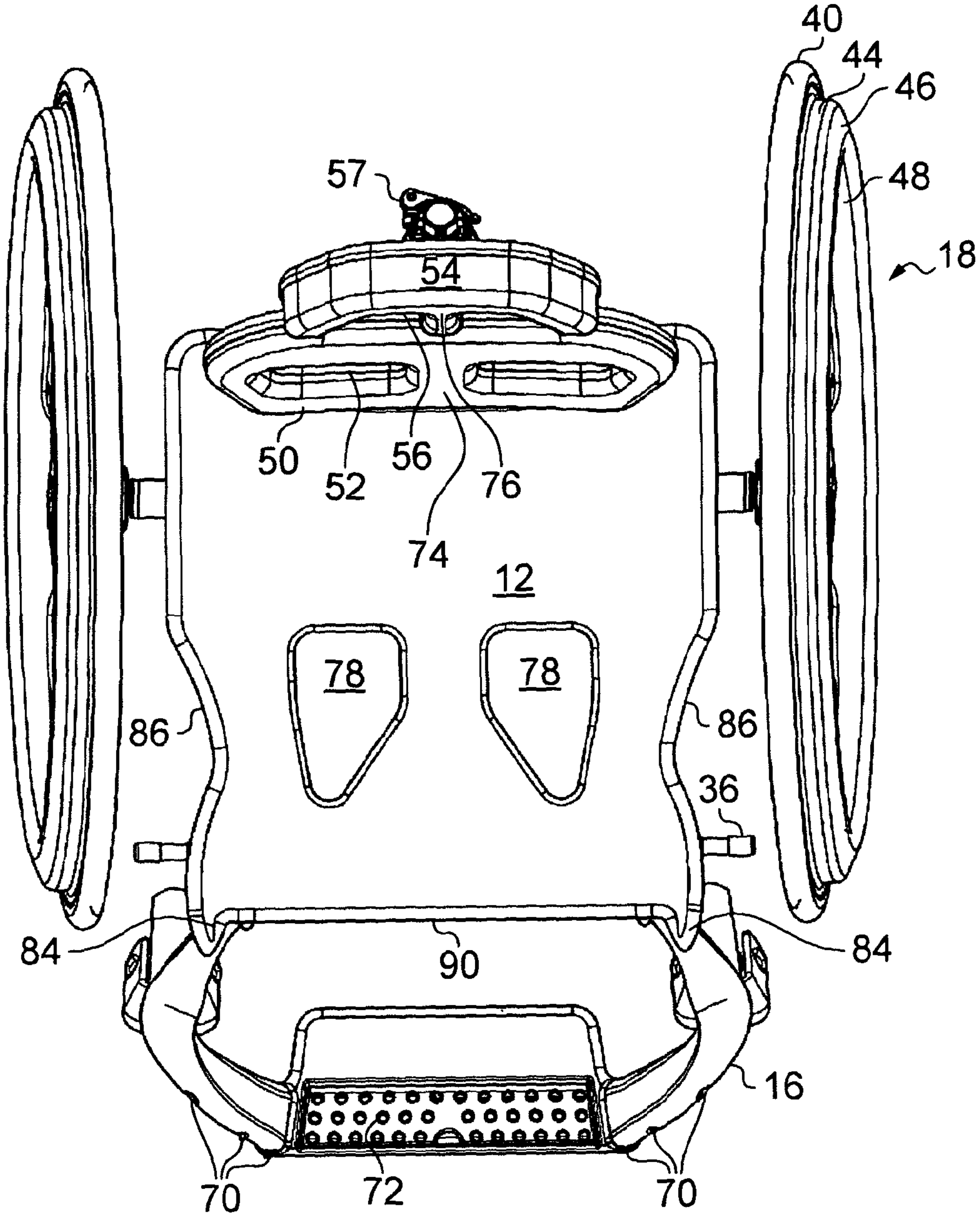
FIG. 8 shows a plan view from above of a wheelchair according to the invention.

Turning now to FIG. 8, seat base 12 is provided with one or more cut-outs 78 and side recesses 86 for added ventilation and weight reduction and to add stiffness and rigidity. Thus these cut-outs and side recess add to the stiffness and rigidity of the seat base 12 by reducing the uninterrupted surface of the seat base by providing transverse walls that extend from one major surface of the seat to the other. At either front corner of seat base 12, handles 84 are provided. These protrude slightly forwardly of a front edge 90 of seat base 12. Handles 84, enable a user to move about the seat base. Main wheel 18 has a tyre 40, first hand engaging surface 44, second hand engaging surface 46 and a third hand engaging surface 48 leading to the inner rim of main wheel 18.

Front stem and/or footrest 16 may be provided with at least one light 70. Light(s) 70 typically comprises at least one LED. In one embodiment, the LED(s) may be mounted remotely elsewhere within the wheelchair and one or more light pipes such as optical fibres provided for directing light to the front stem 14 and/or footrest 16 as shown in FIG. 8. Light pipes such as light pipes comprising optical fibre available from 3M, B3 cables, Optoelectronic manufacturing Corporation Ltd, Bivar Inc, Avago Technologies, Fibre Optic Systems inc, RF Industries Inc. AF Optical inc may be used. In another embodiment, light(s) 70 comprise one or more LED's which may be located within front stem 14 and/or footrest 16.

Where light pipes are provided within front stem 14 and/or footrest 16, the light pipes may be located within these unitary components during manufacture. Where light(s), such as one or more LEDs, are located within the front stem and/or foot rest, electrical wiring to the light(s) may be located within these unitary components during manufacture. For example, a common technique in carbon fibre component manufacture is to mould two halves and bond these together. Where two or more moulds are used to create two or more parts (perhaps two halves) of footrest 16 which are joined together, the light pipes (or electrical wiring) may be positioned in between the two (or more) parts prior to joining these together. Light(s) 70 enable the ground around the wheelchair and/or in front of the wheelchair to be lit up which can be very helpful for a wheelchair user. A battery 65 for the at least one LED may be placed underneath the seat (see FIG. 9). The LEDs may be operated by switch 67 (see FIG. 9).

In one embodiment, the provision of remotely located lights sources, such as LEDs, and light pipes means that this lower part of the wheelchair is water resistant and may be waterproof. This arrangement also protects remotely located light sources, such as LEDs, from impact damage. LED batteries and associated control PCB may be located underneath or moulded inside the seat alongside a recharging point.

In the embodiment in which lights such as LEDs (or light pipes where provided) are located within the frame, such as within the front stem 14 and/or footrest 16, these may be mounted within these components, or elsewhere in the frame, so as not to protrude beyond the profile of the component or frame. Alternatively, these protrude minimally, say 1 mm or 1 to 2 mm, beyond the profile of the component or frame. This provides a more visually pleasing appearance as well as reducing the risk associated with having protrusions on a frame, particularly near a wheel chair user's feet.

There may be at least two LEDs one on either side. Typically, two or three LEDs may be provided on each side of the wheelchair (as seen in FIG. 2 and FIG. 8 on either side of the footrest 16). Typically these will be equidistant apart along the side portion of the footrest 16. Indeed, in FIG. 2, three forwardly facing LEDs 70 have been countersunk into recesses on each of side portions 66 of the open frame shape of the footrest 16 so as to illuminate the ground forward of the wheel chair 10. The light envelope form the LEDs expands so that light emanating from the LEDs may fall downwardly in front of the wheel chair. The LEDS may also be directed by virtue of their mounting position or otherwise to provide illumination of the ground in front of the wheel chair. For example, the surface of the side portion of the open frame shape of footrest 16 may be selected so that it is slopes downwardly, albeit slightly, so that LEDs mounted in that portion of the surface of footrest 16 illuminate the ground. Thus, the LEDs may be mounted in a portion of the surface of the frame, the portion of the surface of the frame being directed in a direction towards the ground during use so as to illuminate the ground in front of the wheelchair.

Alternatively or in addition, the LEDs (or lightpipes where these are provided) are pointing towards the ground at an appropriate angle to illuminate the ground in front of the chair, but the moulded surface on which these are mounted on might not be angled in such a way. An adhesive bond used to fix the LEDs or lightpipes may be used to fix the angle of the LEDs or light pipes with respect to surface of the frame so as to illuminate the ground. This may be in addition or as an alternative to the expansion of the light beam from the LEDs or light pipes to illuminate the ground. The adhesive bond typically forms a hard surface.

Also seen in FIG. 8, lower seatback portion 50 is provided with a user facing surface 74 and upper seatback portion 54 is provided with a user facing surface 76. These two surfaces 74, 76 are generally in line with one another so as to provide a continuing surface of support for a users back despite the presence of cut-outs 52 and 56 and the provision of two separate movable (in relation to one another) seat back portions.

Figure 9:
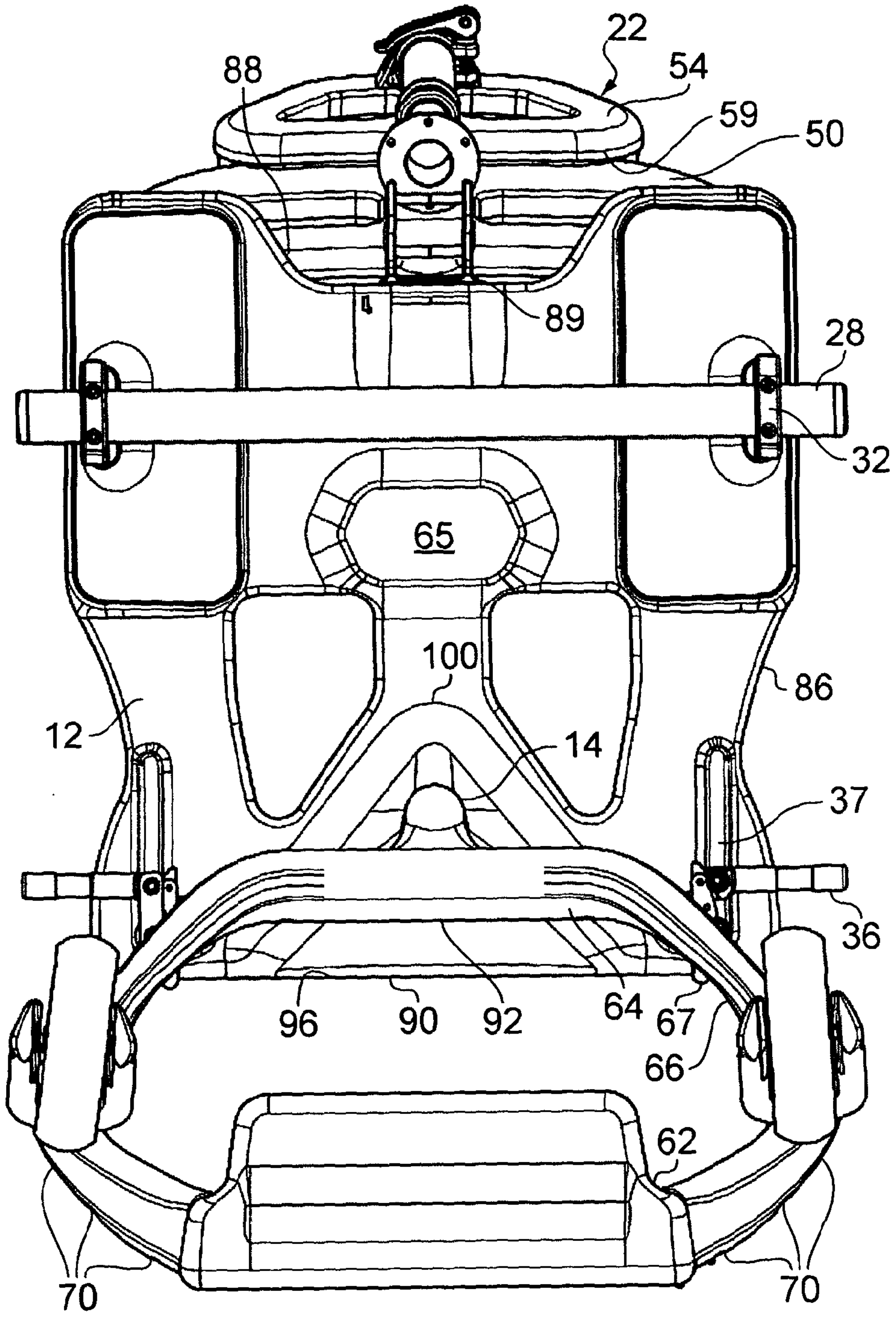
FIG. 9 shows a plan view from below of wheelchair according to the invention.

FIG. 9 shows wheelchair 10 from below without wheels. Here, crossbar 28 is shown having crossbar clamps 32 for clamping the seat support struts 34 (not shown) to crossbar 28. Brakes 36 are provided with an adjustment slot 37 so that these can be accurately positioned with respect to a braking surface on the wheel. Seat base 12 is provided with a recessed cut-out 88 towards the seat mechanism seatback 22 to enable access to adjustable hinge 24. This also saves weight. One or more spacers may be used as extension components (typically rectangular) provided at position 89 within cut-out 88 to extend the effective length of seat base 12 by providing a mounting for seat back 22 rearward of the cut-out 88. Thus, exemplary embodiments of the present invention produce multiple different sizes of wheelchair without different tooling for each configuration for example, the three most popular widths of seat with individual tools: 16', 17' and 18". The depth of seats (centre line length from front edge of seat to rear edge of seat) will be produced as a standard size of 18". Individual seat depths will be determined by the fixing position of the backrest. One or two spacers to be positioned at 89 will allow the backrest to be fixed to the seat to suit the user's needs. No spacers would provide a seat of 16" depth, one spacer would provide 17" seat depth and two spacers would provide 18" seat depth. Thus, 16×16, 16×17, 16×18, 17×16, 17×17, 17×18, 18×16, 18×17, 18×18 seat sizes will be achieved with this arrangement. It would also be simple to produce further seat sizes if demand requires.

A footrest rear portion 64 is also shown behind which can be seen stem 14 and stem footprint 100 which is generally triangular in shape. Stem footprint 100 is the shape of the stem 14 as it meets the underneath surface of seat base 12. A front seam 96 of stem 14 meets a seat base front edge 90 in a smooth contiguous manner. Nevertheless, the front stem 14 is recessed behind the front edge 90 of seat base 12 as will be seen later. Furthermore, a frontmost surface 92 of front rest rear portion 64 is also located rearward of a front edge 90 of seat base 12.

Figure 10:
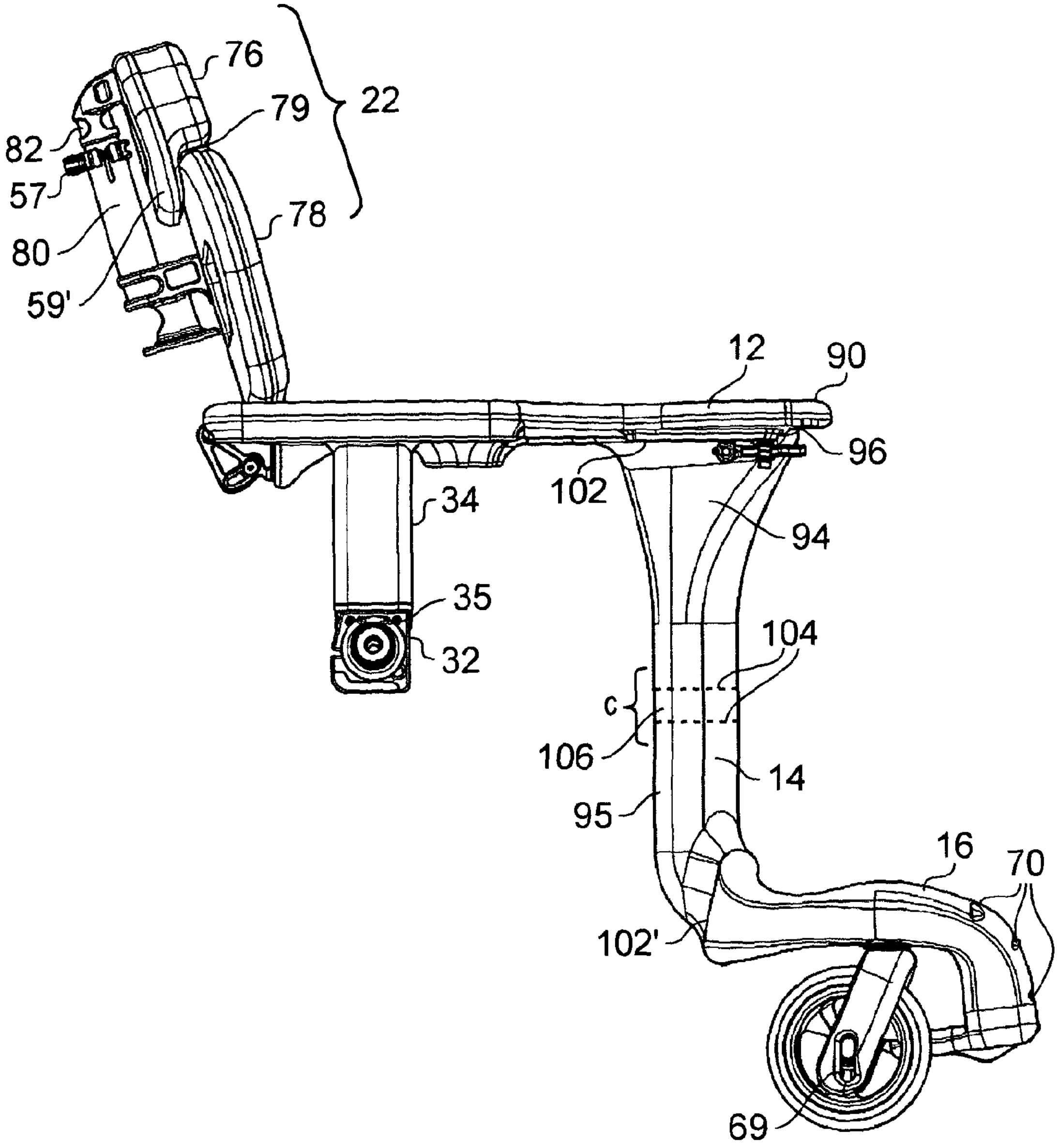
FIG. 10 shows a side elevation view of a wheelchair according to the invention without the main wheels.

FIG. 10 shows seat base 12 and depending therefrom front stem 14 having an upper stem portion 94 and a lower stem portion 95. Upper stem portion 94 is Y-shaped when viewed from the side and when viewed from the front (see FIG. 2). Furthermore, the cross-section of stem 14 is generally triangular in shape and forms a triangular footprint on the underside of seat base 12 as shown in FIG. 9. Furthermore, lower stem portion 96 has a generally uniform cross-section C of the same shape and size. This allows adjustment of the overall length of stem 14 by removal of a predetermined length of stem 106 from one or both of the upper and lower stem portions 94 and 95. Ends 104 are joined together to form a unitary component by joining, for example by bonding, the two parts of the front stem 14 together. Thus, the overall length of stem 14 can be adjusted in a bespoke manner to a user's requirements. Users will require a variety of different front stem lengths to fit their own leg length from knee to foot.

Exemplary embodiments of the present invention use spacers in the tool to adjust the front stem length part, however, this would be expensive for the number of spacers needed. In one example embodiment, the frame of the chair will be built in four sections, namely, seat base 12, top of stem 14, middle/tower of stem 14 and footrest 16. We propose to trim the cured stem to length in the straight section. We will then bond the parts together and aim to achieve a neat join where the stem has been trimmed. Thus exemplary methods of manufacture of the present invention create different wheelchair sizes by focusing on the production of standard sized parts. The bespoke sizing is achieved during the assembly process with the carbon components produced to standard size. The components will then be assembled to customer requirements. Such a method will allow fast turnaround of orders and the bulk production of components.

The risk of creating parts in the outlined method is weight gain. The seat on all chair sizes will be a standard depth of 18". Therefore, a user who requires a 16" seat will carry 2" of extra material along the back edge of their seat. Trimming and bonding the front stem will be a heavier method of production than using insert tooling. Bonding agents are heavier than carbon fibre. Exemplary embodiments of the present invention reduce weight as outlined herein to offset these production methods.

Front stem 14 like seat base 12 and footrest 16 is preferably of monocoque construction, in other words, the overall strength is provided by the skin of the individual unitary components rather than from an internal frame. Removing piece 106 of stem 14 and re-bonding at ends 104 in region of uniform cross-section C, should not unduly affect the strength, rigidity or other performance features of unitary component front stem 14. Similarly, whilst seat base 12, front stem 14 and footrest 16 are each moulded separately and indeed may each be moulded into individual halves (or more parts) which are bonded together to provide each unitary component, this method of construction should not unduly affect the strength of the structure. Thus, seat base 12 is permanently rigidly fixed to front stem 14 at first joint 102. The front most seam (of front stem foot print 100) on seat base 12 lies rearward of the front edge 90 of seat base 12. Preferably, this frontmost seam is also formed so as to provide a continuously varyingly smooth surface between front stem 14 and seat base 12. A second joint 102' is provided between front stem 14 and footrest 16. Again front stem 14 is rigidly and permanently connected to footrest 16 by, preferably, bonding these two components together. Again, this seam 102' is formed, preferably, so as to provide a continuously varyingly smooth surface between front stem 14 and footrest 16. Thus, joints 102 and 102' ensure that seat base 12, single front stem 14, and optionally footrest 16, whilst each being of unitary construction also in combination provide a rigid unitary component. Thus, seat base 12 and stem 14 provide a frame of a cantilever type having an L-shape when viewed from the side.

Footrest 16 is provided with recesses in which the lights 70 terminate to provide light at the lower end of front stem 14. Footrest 16 also includes castor forks 68 having front wheel adjustment slots 69 for adjusting the position of the axis of rotation of front wheels with respect to footrest 16.

Seatback 22 comprises a lower seat portion 78 and an upper seat portion 76. Here upper seat portion 76 is provided with a recess 79 for receiving the uppermost part of lower seat back portion 78 therein. Thus, a portion 59' of upper seatback portion 76 overlaps the upper part of lower seatback portion 78. A lower telescoping portion 80 is fixedly connected to lower seatback portion 78. An upper telescoping portion 82 is fixedly connected to upper seatback portion 76. Telescoping portions 80 and 82 telescope together to facilitate movement of seatback portion 76 and 78 with respect to one another. Once a suitable seatback position is provided, over centre lever mechanism 57 can be used to clamp telescoping portions 80 and 82 fixedly in relation to one another. Thus, the seatback 22 can be adjusted to have a relatively low height facilitating the upper body movements of an active wheelchair user. Alternatively, the upper seatback portion can be extended to full extent allowed by the telescoping portions 80 and 82 to provide a high seatback for comfort as and when required. The overlapping portion 59' enables lower low seat back position and a higher high seat back position without compromising on weight. One option will be that of the telescoping posts 80, 82 being bonded together to the required height so that the weight of the seat clamp and unused portion of the telescoping poles can be saved.

A seat support strut 34 is provided with a crossbar clamp 32 for clamping to a crossbar 28 (not shown). Through holes 35 enable the seat support strut 34 to be fixedly located in different lateral positions with respect to crossbar clamps 32. Thus, the seat base 12 can be positioned at different lateral positions in the forward and rearward directions with respect to crossbar 28 and therefore with respect to two main wheels 18.

Figure 11:
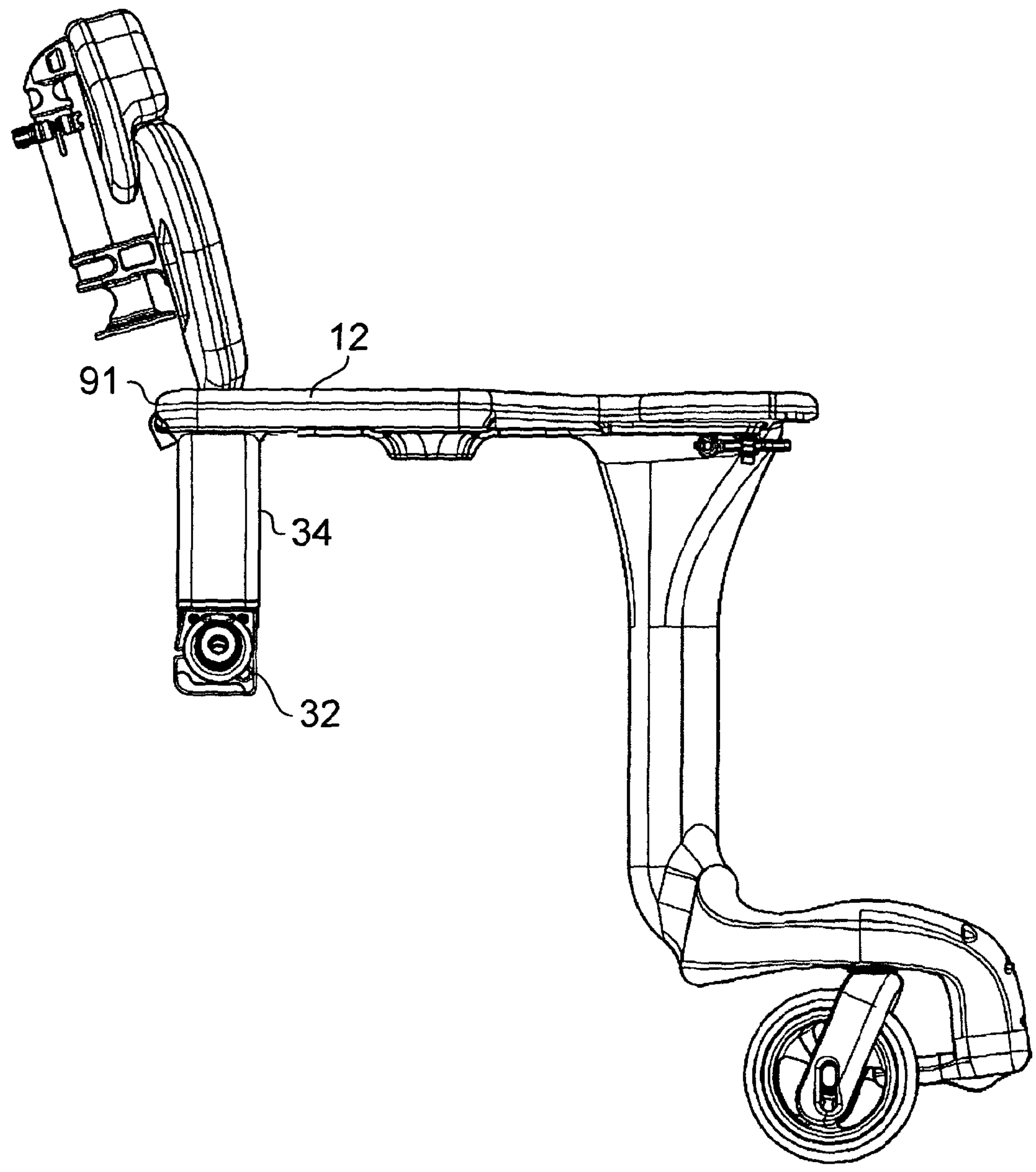
FIG. 11 shows a side elevation view of a wheelchair without the main wheels with a seat support strut in a zero position.
Figure 12:
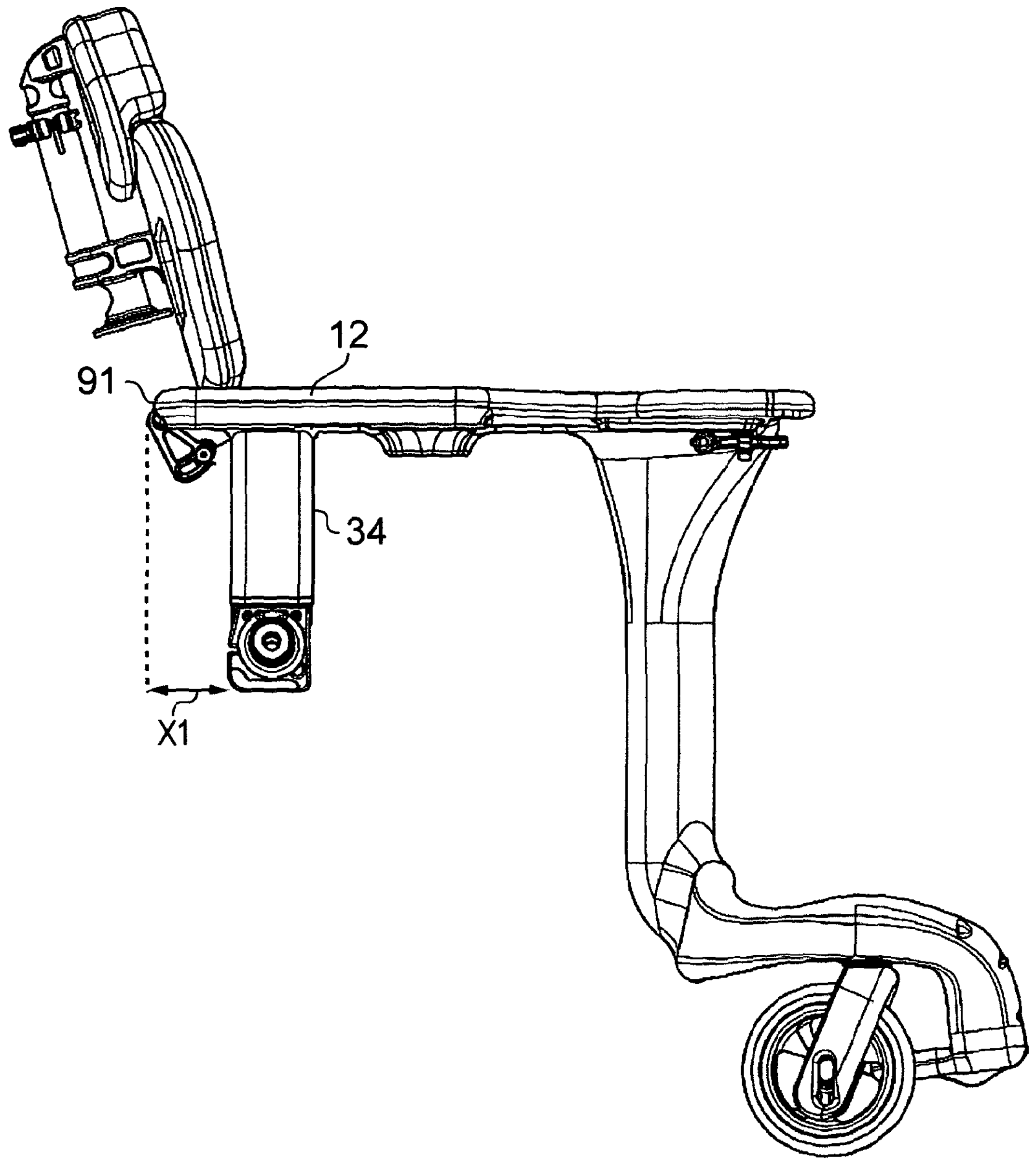
FIG. 12 shows a side elevation view of a wheelchair without the main wheels with seat support struts in a +1 position. Typically, +1 is a +1 inch position.
Figure 13:
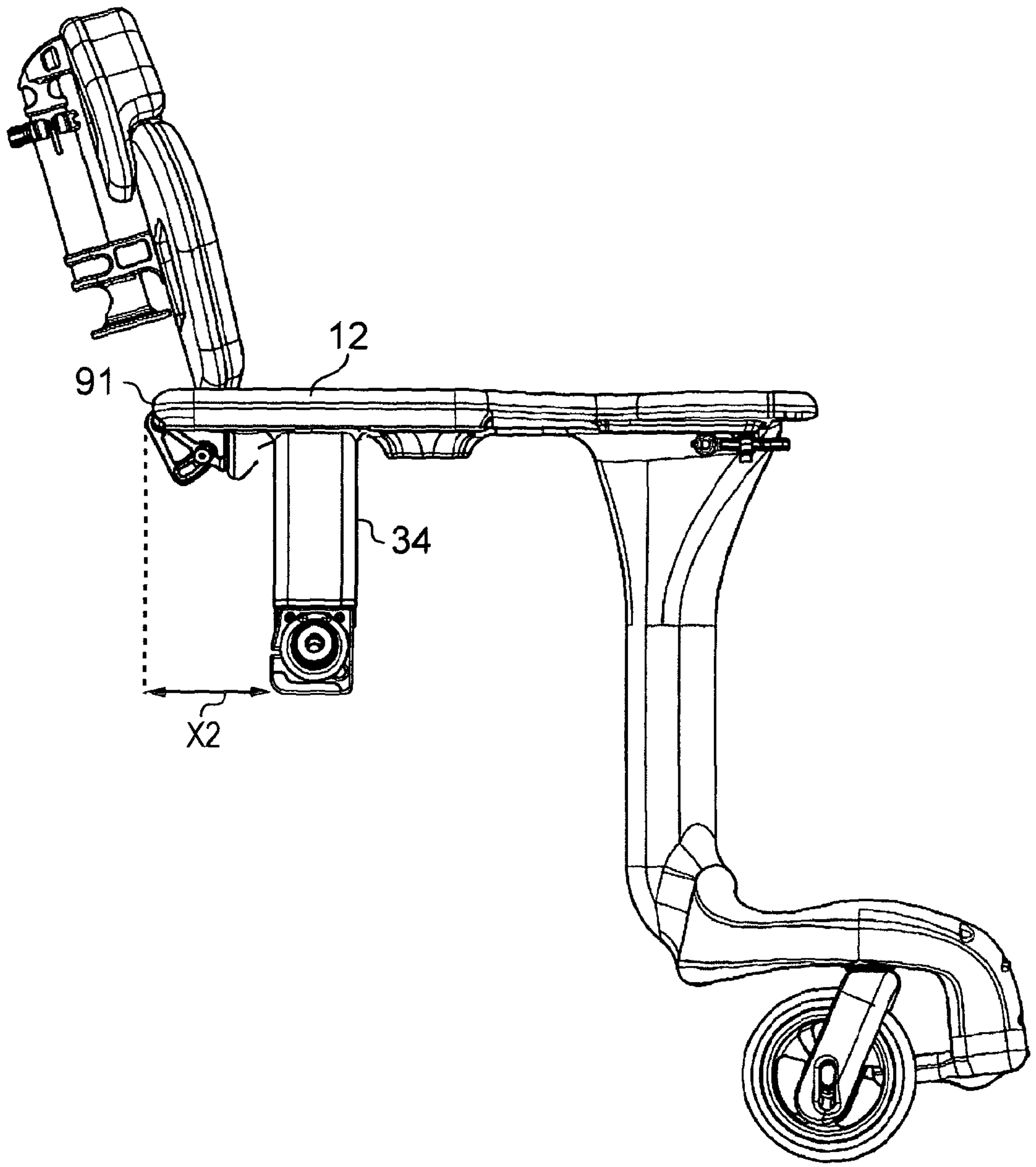
FIG. 13 shows a side elevation view of a wheelchair without main wheels with a seat support struts in a +2 position (such as +2 inches).

Turning now to FIG. 11, seat support strut 34 can be seen immediately adjacent rear edge 91 of seat base 12. This is termed position zero. Thus, in addition to the minor forward and rearward lateral movement afforded by seat strut 34 with respect to crossbar clamps 32, the seat support strut 34 can be positioned at different locations on the base of seat base 12. This is typically done during manufacture and enables bespoke design according to a user's requirements. FIG. 12 shows seat support struts 34 positioned at a distance X1 forwardly from rear edge 91 of seat base 12. This is typically termed position +1. Turning now to FIG. 13, seat support 34 is positioned at distance X2 approximately twice that of X1 (in FIG. 12) forwardly of rear edge 91 of seat base 12. This is termed position +2.

Figure 14:
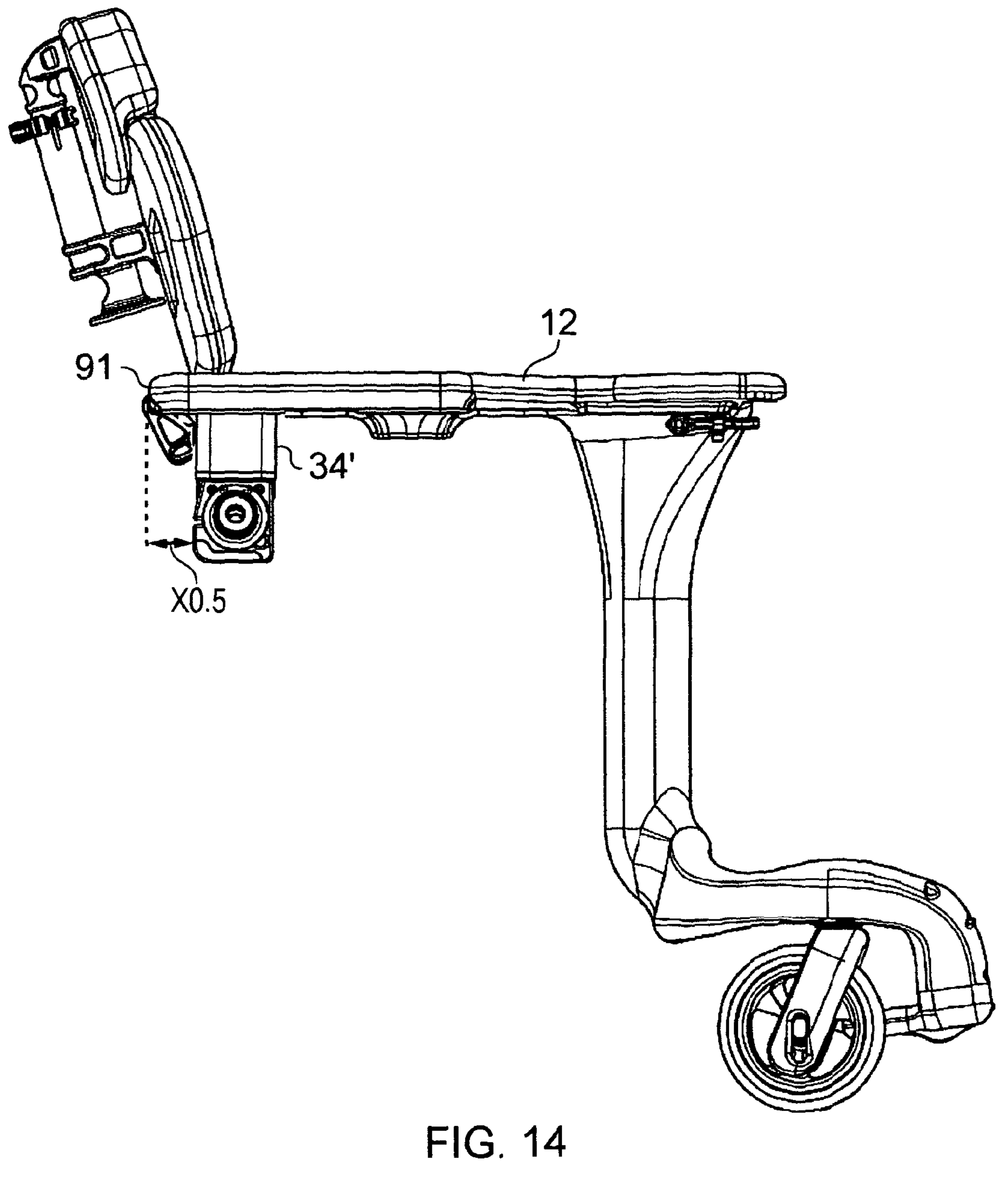
FIG. 14 shows a side elevation view of a wheelchair without the main wheels with a shorter seat support struts in a +0.5 position (such as +0.5 inches). Other increments up to +4 inches or increments in cm such as +0.5 cm, +1.0 cm, +2.0 cm etc up to the equivalent cm amount could be provided.

In FIG. 14 a shorter seat support struts 34' at a position +0.5 is shown being a distance X0.5 from rear edge 91. A shorter seat support strut 34 again can be part of the bespoke design to suit a user's requirements and is selected prior to manufacture. Selecting a shorter seat support strut 34' may mean that a user requires larger wheels as he or she prefers to be further from the ground. Alternatively, it may facilitate the provision of seat dump in which the rear of seat base 12 is positioned lower than the front of seat base 12.

Figure 15:
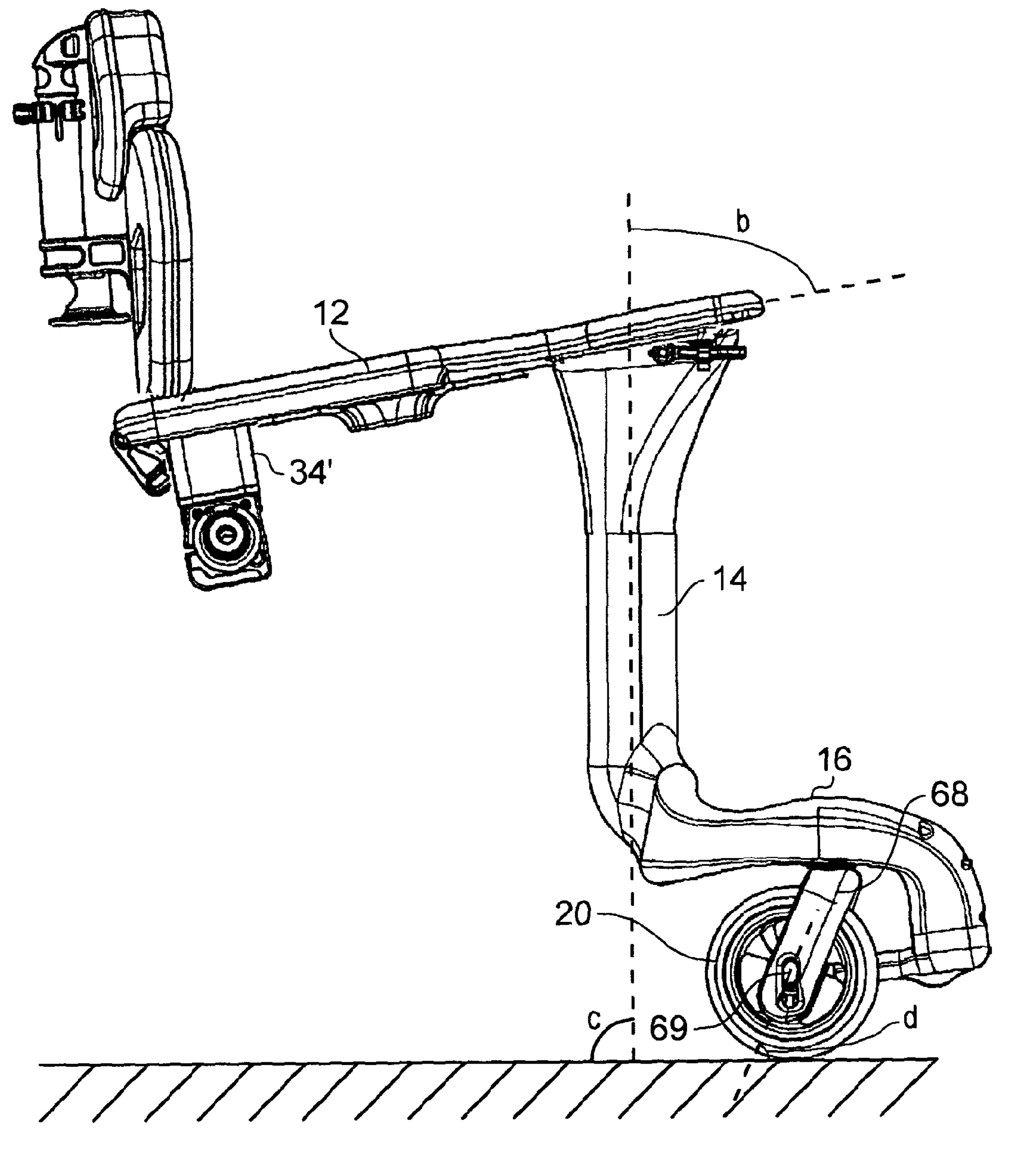
FIG. 15 shows a side elevation view of a wheelchair without main wheels with seat base 12, seat support struts 34 and front stem 14 being arranged to provide seat dump.
Figure 16:
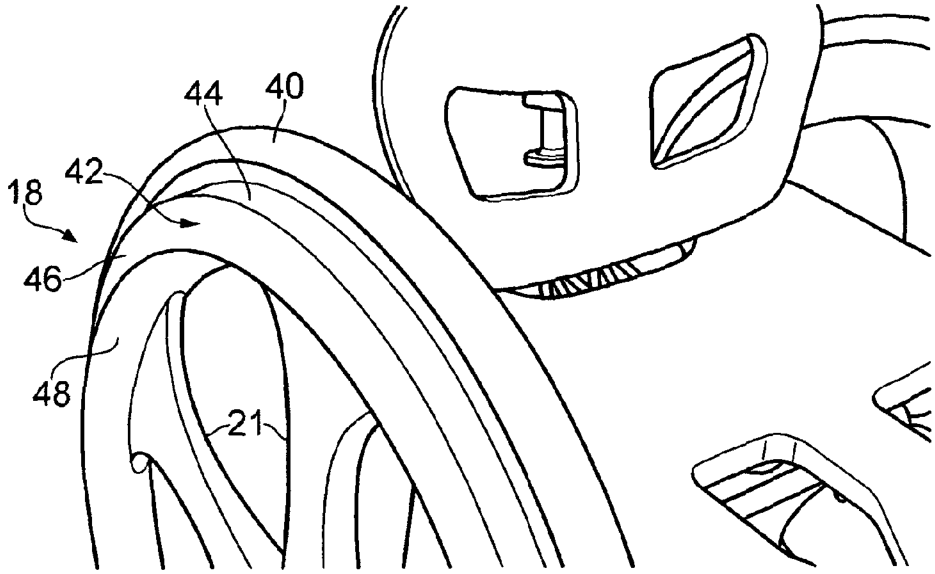
FIG. 16 shows a perspective close-up view of a wheel of a wheelchair, according to a further aspect of the invention showing integrally moulded push rim.

This is shown more clearly in FIG. 15 in which the seat base 12 is at an angle "b" with respect to a vertical line perpendicular to the ground. In this particular example, front stem 14 is generally perpendicular to the ground and angle "c" is around 90°. It will be appreciated by those skilled in the art that front stem 14 need not necessarily be vertical but this is one preferred option. In this particular case seat base 12 is fixed at a different angle with respect to an axis drawn through front stem 14 than a similar construction seen in FIG. 10. Typically, this will require the provision of differently shaped moulds for the upper portion of stem 14 during manufacture. If this adjustment is not made during manufacture, then front stem 14 may well lie at an angle to the vertical to enable the shorter seat support struts 34 and associated main wheels 18 (not shown) to support seat base 12 on the ground. Thus, footrest 16 and front wheel forks 68 will be at a different angle to the ground than hitherto shown. In these circumstances front wheel adjustment slot 69 may be utilised to readjust the position and height of the axis of rotation of wheels 20 with respect to front wheel forks 68 and therefore with respect to footrest 16 to control the angle "d" of front wheel forks 68 to the ground.

Referring to FIGS. 16, 17, 18 and 19, FIG. 16 shows a close-up of main wheel 18 having an integrally moulded push rim 42 formed therewith. Main wheel 18 is provided with a typical rubber tyre 40 of 26 or 28 inches in diameter. Push rim 42 is here integrally moulded with the wheel itself and in particular with tyre rim 41 and spokes 21 (see FIG. 19). First, second and third hand engaging surfaces 44, 46 and 48 are provided. Typically these are generally planar but may be slightly curved. First hand engaging surface 44 is typically outwardly facing and circumferentially positioned on wheel 18. Typically this, and indeed second and third hand engaging surfaces 46 and 48, is smooth to enable free running of the push rim through the hands during motion of the wheelchair. Nevertheless, the provision of integrally moulded carbon fibre push rims ensures that the surface of these are graspable when wet. The push rim 42 may be integrally formed with the remainder of the wheel or formed as a separate unitary component and bonded to the wheel (not shown). Thus, a joint 102'' may be provided between push rim 42 and wheel rim 41. Wheel rim 41 includes a recess 41' for receiving a tyre 40 therein. The push rim 42 is directly next to the wheel rim 41. The wheel rim shown is for a tubular tyre without an inner tube, but a clincher type tyre and associated clincher type wheel rim may be used.

Figure 19:
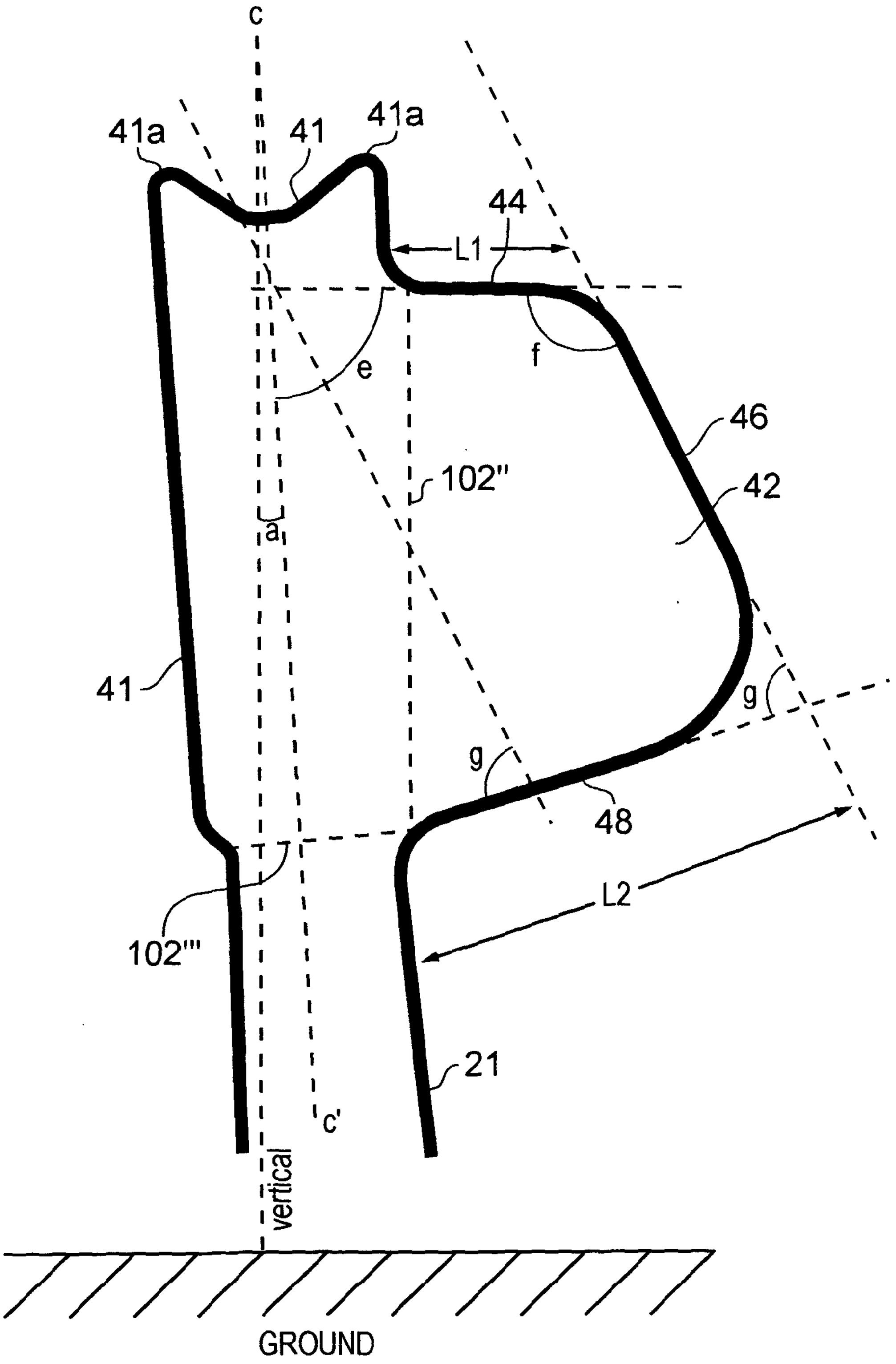
FIG. 19 shows a cross-sectional view of a wheel rim along line AA' In FIG. 17.

Second hand engaging surface 46 may be at an obtuse angle "f" with respect to first hand engaging surface 44. Third hand engaging surface 48 may be provided at 90° or at an acute angle with respect to second hand engaging surface 46. This is angle "g". As described earlier, the wheels 18 rotate at an angle "a" with respect to the true vertical in one embodiment and first hand engaging surface 44 is generally horizontal when at the topmost part of wheel 18, thus, angle "a" plus angle "e" both shown in FIG. 19 is typically approximately equal to 90°. First hand engaging surface 44 is typically shorter, having width L1, than second hand engaging surface 48 having width L2, thus L1 is less than L2. Typically hand engaging surface 44 will engage a thumb portion of a hand, second hand engaging surface 46 will engage a palm surface of a hand and third hand engaging surface 48 will engage the fingers of a hand. Thus, the hand engaging surfaces 44, 46 and 48 forming a trapezoidal cross-section, provide an extensive contact area for hands with the wheel whilst at the same time presenting a smooth surface to the hand to prevent damage to fingers and the like during rotation of wheel 18.

Figure 17:
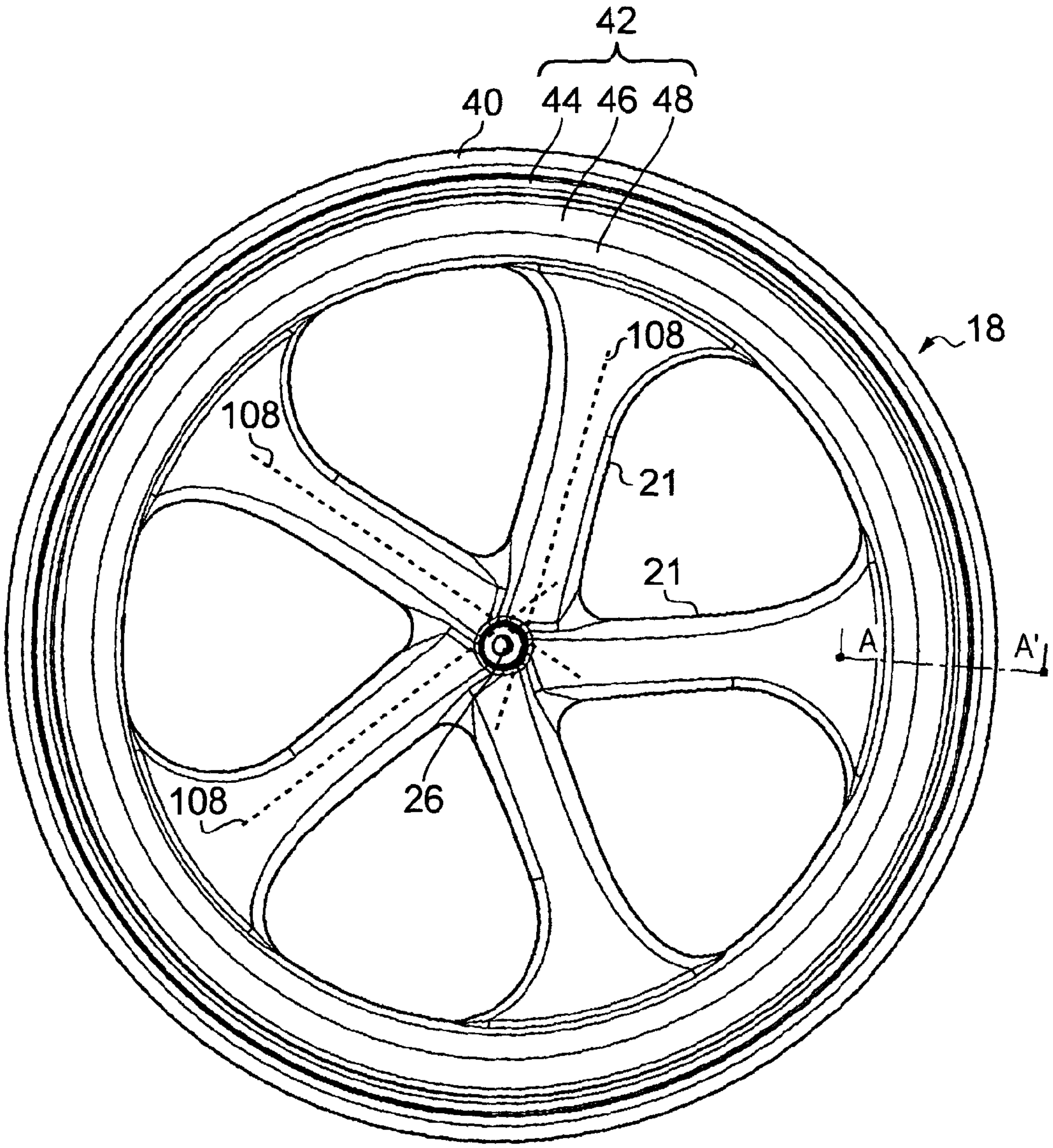
FIG. 17 shows a side elevation view of a wheel according to a further aspect of the invention.

Referring to FIG. 17, spokes 21 are shown having centre lines 108. It can be seen from FIG. 17 that centre lines 108 do not pass through the centre of axis of rotation 26 of wheel 18. These centre lines 108 lie off centre of axis of rotation 26. This offset spoke placement adds strength to wheel 18 by providing extra material circumferentially around the axis of rotation 26 of the wheel. In this example embodiment, spokes 21 are also integrally formed with wheel rim 41 and push rim 42 as shown in FIG. 19. In one embodiment, spokes 21 may be formed separately and joined to wheel rim 41 at joint 102'. Nevertheless, in one exemplary embodiment wheel rim 41, push rim 42 and spokes 21 are integrally moulded together using standard carbon fibre moulding techniques. This may include vacuum forming. Alternatively this may mean providing carbon fibre in two halves of a mould along line CC' in FIG. 19 and joining the two moulded halves together. As seen in FIG. 18A, a wheel 18 is shown having a tyre 40 mounted on wings 41A of wheel rim 41. First, second and third hand engaging portions 44, 46, and 48 respectively are shown. The wheels may be nominally 26 inches, 28 inches, 29 inches or 700 c in diameter as referred to by those skilled in the art. The actual diameters in practice may be slightly smaller than this nominal measurement would suggest. Referring briefly to FIG. 19, a wheel is shown in use with respect to the ground having a camber angle "a". In this wheel, the tyre (not shown) would also be located at a camber angle "a" within wings 41A of wheel rim 41. In other words wings 41A typically may be canted at an angle with respect the ground but are typically equally sized and equally spaced from the centre of the wheel.

Figure 20:
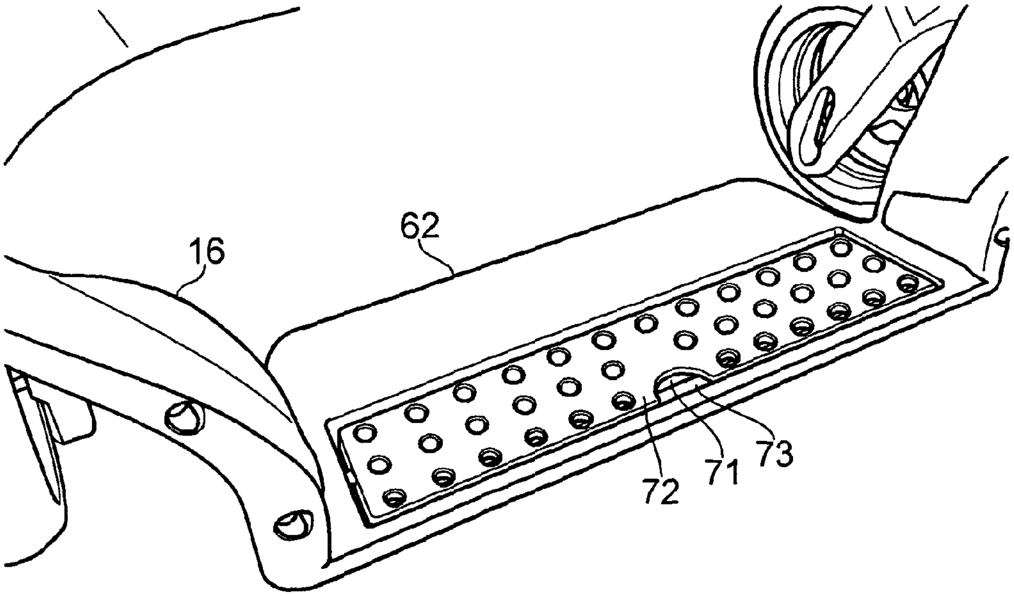
FIG. 20 shows a perspective close-up view of a footrest of a wheelchair according to a further aspect of the invention.
Figure 21:
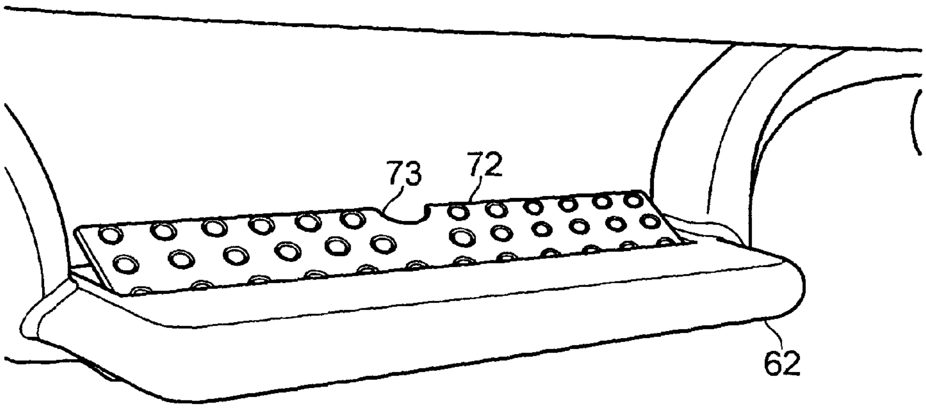
FIG. 21 shows a rear perspective view of the footrest of FIG. 20 when a footrest plate is not in a raised position.
Figure 22:
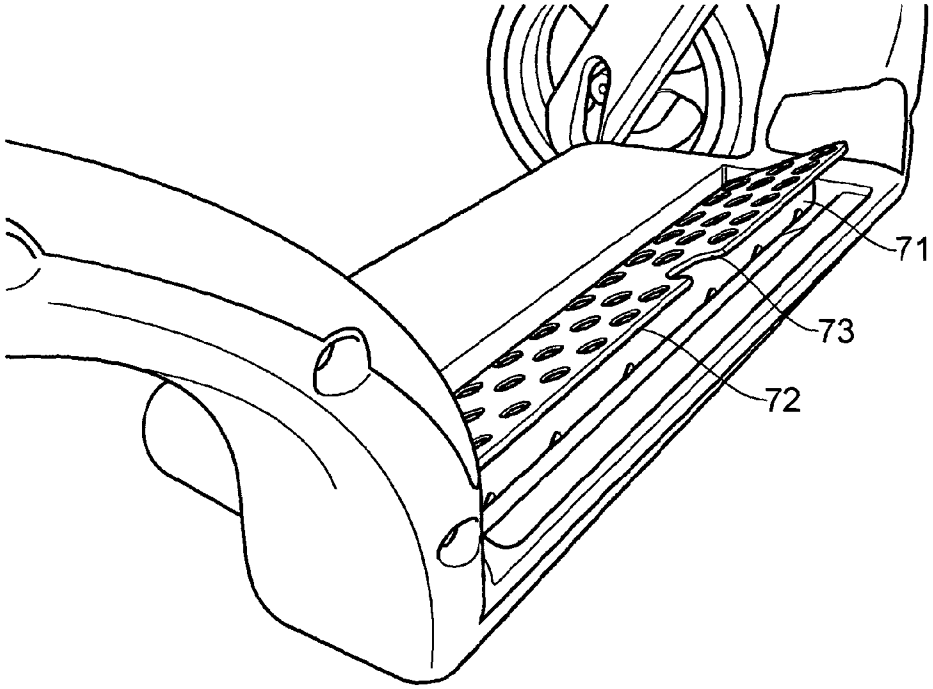
FIG. 22 shows a front perspective view the footrest of FIG. 20 when a footrest plate is in a raised position.

Referring now to 20, 21 and 22, a footrest plate 22 is provided in footrest 16. Footrest plate 72 has a recess 73 for accessing a locating mechanism 71. Locating mechanism 71 may be a friction resistance mechanism such as a friction hinge (and associated rotating plate) and/or friction fit mechanism and/or snap fit mechanism or the like. Thus, in FIG. 20, footrest plate 22 lies in the plane of footrest of a front footrest portion 62. In FIG. 21 however, a user has raised footrest plate 72 by pulling on plate through recess 73. This enables a user to make minor adjustments to the height of footrest plate 72.

Figure 23:
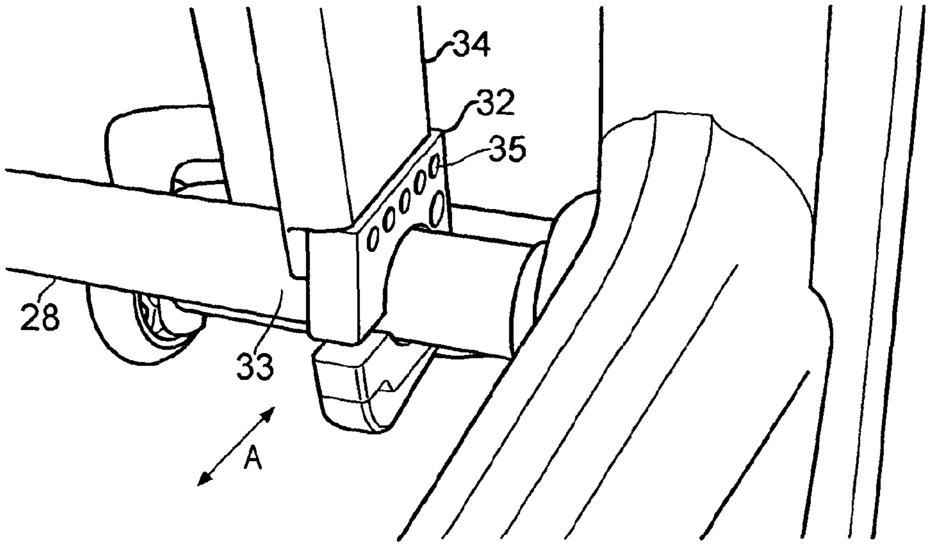
FIG. 23 shows a close-up perspective view of the clamping of seats support struts to the crossbar between the main wheels.

Turning now to FIG. 23, seat support strut 34 is shown with adjustable crossbar clamp 32 having through holes 35 therein. An overlapping portion 33 in the base of seat support strut 34 can be seen. This enables relative movement in direction A, in other words backwards & forwards with respect to one another between seat support strut 34 and clamp 32.

Figure 24:
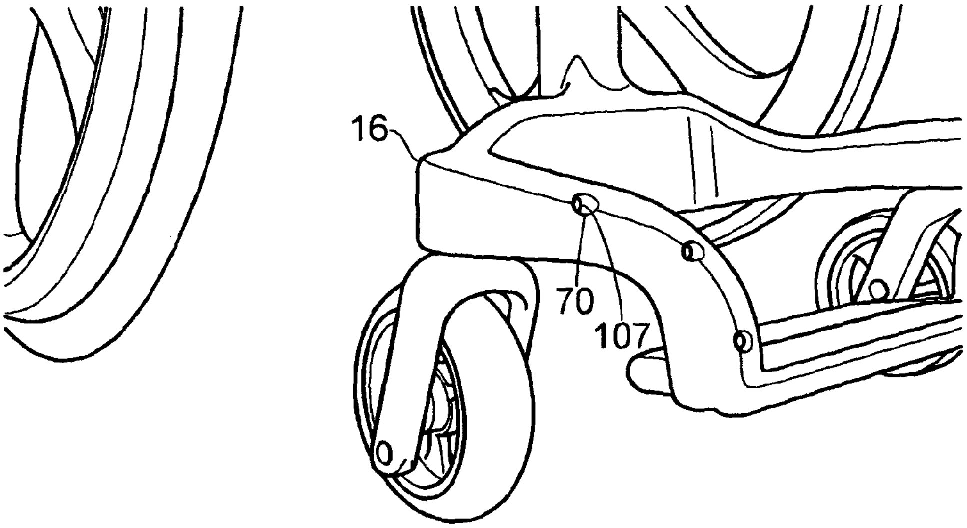
FIG. 24 shows a close-up perspective view of a footrest having one or more lights according to a further aspect of the invention.

Turning now to FIG. 24, a close up of footrest 16 can be seen showing recesses 107 comprising termination of lights 70 comprising light pipes or LEDs. In one preferred embodiment at least one light 70 is located on the side portion of footrest 16. Typically, these illuminate forwardly of the wheelchair and may also illuminate downwardly. This enables a user to know the ground conditions ahead. Similar lighting arrangements comprising at least one light pipe may be used in a bicycle or a child's pushchair or a child's pram. The light pipe may for example comprise at least one or more optical fibres. The light pipe may terminate to provide light emitting from an end thereof. The light pipe may be located within one or more components such as handle, handle bar, seat, seat stem, front stem, front or back wheel mount (such as a front or back wheel fork) of a wheelchair, bicycle, push chair or pram. The light pipe may terminate at an end located in a surface of one or more of these components. These components may be formed from carbon fibre and have the light pipe located inside. The light pipe may be moulded inside during manufacture, for example in a single carbon fibre structure or may be located by bonding two (or more) carbon fibre parts about the light pipe. The light pipe may be flexible.

Figure 18B:
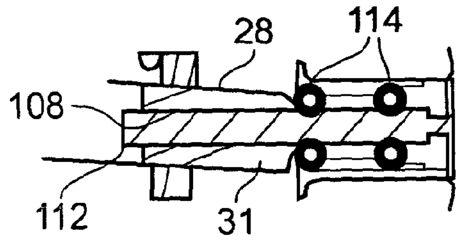
FIG. 18B shows a cross sectional view of a wheel hub taken across line DD' in FIG. 18A and associated axle pin within a cross bar 28.
Figure 18A:
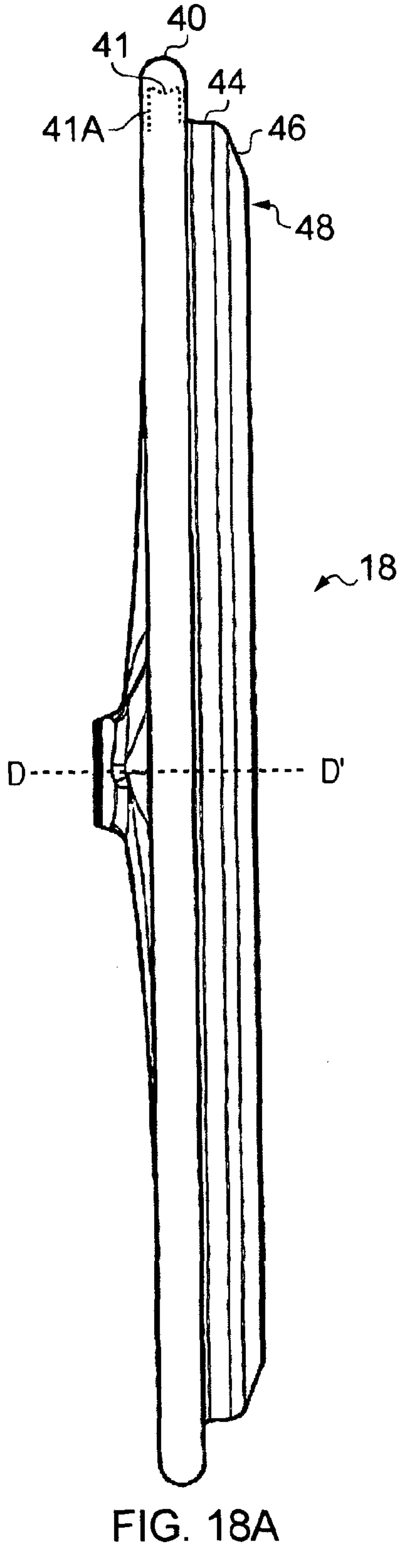
FIG. 18A shows a front elevation view of a wheel according to a further aspect of the invention.
Figure 26:
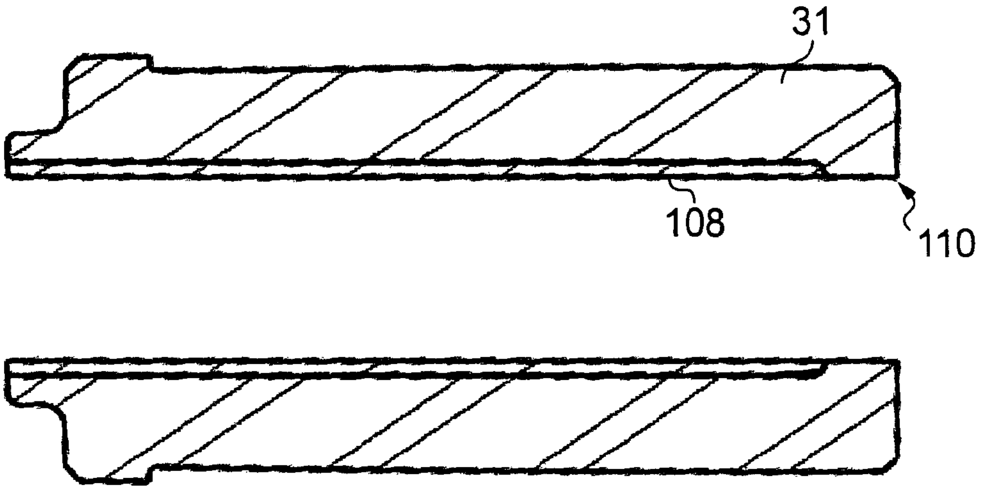
FIG. 26 shows a cross-section through the axle pin housing FIG. 25 along line BB'.
Figure 25:
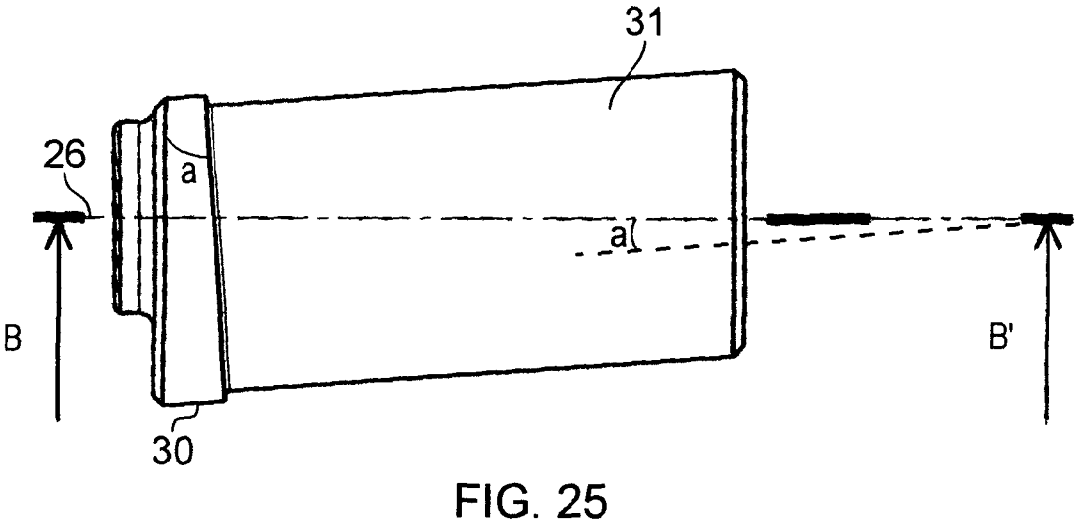
FIG. 25 shows an elevation view of an axle pin according to a further aspect of the invention.

Referring now to FIGS. 18B, 25 and 26, an axle pin housing 31 is provided with an axle pin housing entrance 30. As can be seen here, the main wheel axis of rotation 26 is at an angle “a” with respect to the axle pin housing 31. It is this axle pin housing that determines wheel camber as required by a user during use. The axle pin housing 31 may be machined with a through hole axis at an angle with respect to an end of the axle pin housing of “a” to suit the desired camber angle. An inner bushing 108 is provided for receiving a highly polished spigot 112 on wheel 18 therein (see FIG. 18B). The axle pin housing entrance 30 has an angle “a” to facilitate accurate location of axle pin at the desired camber angle along the axis of rotation 26 of the wheel whereas the wheel axle pin housing 31 is located in generally horizontal crossbar 28 (see FIG. 18B). In an example embodiment, as shown, the inner bushing 108 stops short of the full length of the axle pin housing. This is so that the quick release detente mechanism for the wheel expands and contracts on more robust metal surfaces around the corner 110. This protects the friction reducing or frictionless inner bushing 108 from damage by the quick release detente mechanism. Ceramic bearings 114 are also seen in the wheel in FIG. 18B.

Unlike conventional designs of wheelchair exemplary embodiments of the present invention enable the height of the footrest to be fixed to user requirements at the time of ordering. An exemplary embodiment of the present invention provides a no-tools fine adjustment within the footrest that the user can adjust at will—raising the height when needed for perfect grip. A footrest plate may be used or as an alternative embodiment the principle of this no-tools foot adjuster may be based on two rollers pivoted off centre at either end. The user will simply rotate the rollers situated under their feet to achieve a higher or lower elevation and lock into position. With two rollers the user can also adjust foot angle, 20 mm of adjustment will be available. An alternative footrest has a rotatable foot plate that can be rotated into position.

Exemplary embodiments of the present invention will be fitted with six small yet powerful LEDs in the front of the footrest providing excellent forward illumination. A compartment under the seat houses a rechargeable li-ion battery. All the wiring will be concealed within the frame protected from the elements and damage. The LEDs will be operated by via waterproof switch under the seat edge.

Exemplary embodiments of the present invention will use a carefully shaped push rim that is ergonomically moulded to fit the shape of a gripping hand. Made from carbon fibre in exemplary embodiments, the push rim will offer much increased grip over aluminium, even in the wet. These will be designed for excellent pushing performance and energy efficiency and will not leave any marks on the user or around the home.

Producing the wheels and push rims as one integral unit in exemplary embodiments avoids the significant complications changing hubs that have been bonded into a carbon wheel. The laying up of carbon fibre over this complex shape and achieving the required strength to weight ratio is important.

Exemplary embodiments of the present invention will use full ceramic bearings throughout. Ceramic bearings are largely lubricant free and are designed for hostile environments. The user of exemplary embodiments of the present invention can avoid the embarrassment of squeaky wheels. They will be free to take their chair wherever they want and not worry that their wheels will seize, rust or corrode and they will enjoy a 60% weight saving over steel sealed bearings. In one exemplary embodiment plane bearing technology may be used between the axle and axle port, therefore removing the need for lubricant altogether.

Exemplary embodiments of the present invention to achieve stiffness and strength will use a combination of foam and honeycomb core materials frequently used in F1. Carbon fibre parts are built up with layers of carbon fibre cloth (typically carbon fibre cloth impregnated with resin), the more layers the stronger the part. As well as building up thickness, cloth can also be laid with the weave in various directions (such as at an angle from one layer to the next) to offer strength in various directions. However, the more cloth the greater the weight therefore to achieve the perfect layup (amount and direction of carbon cloth and core materials) may require a combination of suitable different core material combined with various carbon fibre cloth layups for different areas of the frame and wheels. Exemplary embodiments of the present invention will use the minimum material usage to achieve strength and stiffness in a real life excessive use environment. Exemplary embodiments of the present invention will use a layup bespoke to the users weight and tolerance. This will mean that an 8 stone user will not need to carry the weight of frame needed by an 18 stone user.

Exemplary embodiments of the present invention create large radiuses at junctions as one way to reduce material around corners. Thus, if there are weak junctions that need a lot of carbon layers to make strong, these may be re-designed in CAD to increase the radiuses and spread the load, therefore to reduce the amount of carbon needed.

In exemplary embodiments of the present invention, during manufacture the user will state the leg length they require. As the front wheels are fixed to the footrest a short front stem alone would result in the seat tilting forward. To offset this forward tilt the main wheels will be mounted in a higher position on the frame—dropping the rear seat height. For most users this will result in a satisfactory level sitting position. However, for a user with a shorter leg length this will result in them sitting lower than they would in a conventional chair—closer to the main wheel axle. There are two solutions for the shorter leg user so they don’t sit too low down. Firstly, exemplary embodiments of the present invention could extend the length of the front castor wheel forks therefore raising the height of the front end of the chair. This would mean not needing to mount the main wheels in a high position. However, this may run into problems with wheel clearance around the footrest when the castor fork rotates 360. Another possible solution would be to fit an extension to the castor fork mounting mechanism. This would result in the front end of the chair being lifted without any knock on result on the turning circle of the castor fork. It would mean a newly bespoke designed insert for the castor mounts.

Seat dump is a very popular trend in lightweight wheelchairs where the rear of the seat sits lower than the front of the seat. The result is the user sits with their knees higher than their waistline. This seating position gives the user better balance and creates a shorter overall chair and user length for greater agility. To achieve seat dump in exemplary embodiments of the present invention, the main wheels will be mounted in a high position while the front wheels remain unchanged and relative to leg length. This will result in the seat tilting backwards. The angle adjustment on the backrest will bring the backrest back to the vertical position. A possible problem with extreme seat dump set ups—which can be as much as a 4" offset will be on the castor forks. Exemplary embodiments of the present invention aim to achieve minimum weight and have the minimum material around the castor mount mechanism. By altering the angle of the seat beyond level (at an angle to the horizontal), the angle of the castor fork will also change and become straighter (closer to the vertical having been at a negative angle). The risk is that straighter forks may flutter and be difficult to control when the chair is moving quickly. Some manufacturers get around this problem by having angle adjustable castor forks. In exemplary embodiments of the present invention, forks are 4" long approx 3" shorter than on conventional designed chairs. This short design may help avoid wheel flutter.

Thus, the wheelchair of the invention has a number of different aspects to it. In one main aspect, a single front stem in the form of a unitary component, typically of monocoque is provided typically recessed behind a front edge of the seat base 12. This enables a user to locate the seat base immediately adjacent a car seat or the like. This is especially the case if footrest 16 is particularly low rise. In particular, the footrest 16 may have a height less than half the distance between the crossbar height and the ground. Typically this will be of the order of 4, 5 or 6 inches. Thus, the footrest 16 can slide beneath a vehicle facilitating transfer from the seat base 12 to a wheelchair. Another example embodiment is the rigid nature of the front stem and seat base and in combination with the footrest 16.

Further aspects of the present invention will use one or more of the following. 1) Mono cantilever front stem combined with low castor housing facilitating closer access to car seats, beds, toilets etc. 2) No tools adjustable footrest—the footrest adjustment raises foot height and angle only. It does not raise the user's leg out in front of them. 3) Lubricant free axles or axle protectors for a wheelchair. 4) Two piece extendable backrest with quick release 5) Wheel with integrally moulded push rim.

Exemplary embodiments of the present invention will have a profound impact on quality of life for the user. The increased accessibility and weight saving measures featured in the design will make for an easier independent lifestyle. For the families of users the reduction in size and weight of this wheelchair will help them. Users can transfer with ease, and in other aspects of the invention will not have to struggle with a heavy chair and not get covered in oil, or damage their car when getting in.

The invention claimed is:

1. A wheelchair comprising:

- a rigid seat base adapted to support a user;
- a single front stem rigidly attached to a front end of the seat base;
- the seat base and front stem forming a frame of a cantilever-type having an L-shape when viewed from the side;
- wherein the single front stem is rigid and comprises a first unitary component;
- a footrest positioned at a lower end of the front stem configured to support the user's feet, wherein the footrest comprises a second unitary component;
- wherein the footrest is rigid;
- wherein the footrest comprises a mounting for one or more front wheels;
- wherein the two front wheels are spaced apart a distance wider than a width of the seat base and/or narrower than a distance between a central axes of rotation of the main wheels;
- wherein the second unitary component is permanently attached to the first unitary component;
- wherein the footrest is permanently attached by being permanently bonded to the first unitary component forming the front stem.

2. A wheelchair according to claim 1, wherein the seat base comprises a third unitary component; and wherein the first unitary component forming the front stem is permanently attached to the third unitary component forming the seat base to form a fourth unitary component comprising the frame of cantilever-type having an L-shape when viewed from the side.

3. A wheelchair according to claim 1, wherein the first unitary component comprising the front stem lies rearward of a front edge of the seat base.

4. A wheelchair according to claim 1, wherein at least one of (a) the front stem, (b) the seat base, (c) the footrest and (d) main wheels is of monocoque construction.

5. A wheelchair according to claim 1, wherein the front stem is at least one of: Y-shaped when viewed from the front, or Y-shaped when viewed from the side.

6. A wheelchair according to claim 1, wherein the front stem comprises a triangular cross-section.

7. A wheelchair according to claim 1, wherein the front stem is at least one of non-folding, non-adjustable, or of fixed pre-determined length.

8. A wheelchair according to claim 1, wherein the front stem comprises 2 or more sub components permanently attached together to form the first unitary component.

9. A wheelchair according to claim 1, wherein an uppermost surface of the footrest or an uppermost surface of at least a portion of the footrest is positioned at a height above ground of around half or less of a height above ground of a main wheel axis of rotation.

10. A wheelchair according to claim 1, further comprising at least one light located at or near a lower part of the front stem; wherein the at least one light comprises at least one light source; wherein the at least one light is located in the footrest; wherein at least one light or at least one light source comprises at least one LED.

11. A wheelchair according to claim 1, further comprising at least one main wheel, the main wheel comprising a wheel rim and forming a third unitary component; wherein the main wheel further comprises one or more spokes integrally formed with the wheel rim to form the third unitary component.

12. A wheelchair according to claim 11, wherein at least one wheel comprises a push rim; and wherein the push rim is integrally formed with the wheel rim to form the third unitary component; wherein the push rim has a trapezoidal cross-section forming first, second and third hand engaging surfaces.

13. A wheelchair according to claim 1, wherein the wheelchair is water resistant and/or waterproof; the wheelchair comprising the first unitary component forming the front stem and either or both of a third unitary component forming the seat base and the second unitary component forming the footrest, the unitary components being rigidly and permanently bonded together so as to be water-resistant and/or waterproof.

14. A wheelchair according to claim 1, wherein the front stem is substantially vertical during use.

15. A wheelchair, comprising:

- a rigid seat base adapted to support a user;
- a rigid single front stem rigidly attached to a front end of the seat base, the seat base and front stem forming a frame of a cantilever-type having an L-shape when viewed from the side, wherein the front stem is rigid and comprises a first unitary component;
- a footrest positioned at a lower end of the front stem and configured to support the user's feet, wherein the footrest comprises a second unitary component, and wherein the footrest is rigid, and wherein the footrest has an open frame shape comprising one or more side portions connecting a front portion configured to support the user's feet thereon and a rear portion configured to receive the user's ankles; and wherein the front portion and at least part of the side portions have a height above the ground of around half or less of the height above the ground of a main wheel axis of rotation.

16. A wheelchair, comprising:

a rigid seat base adapted to support a user;

a rigid single front stem rigidly attached to a front end of the seat base, the seat base and front stem forming a frame of a cantilever-type having an L-shape when viewed from the side, wherein the front stem is rigid and comprises a first unitary component; and one or more main wheels, wherein a front edge of the seat base and/or a handle on the seat base extends forwardly beyond a periphery of the one or more main wheels.

17. A wheelchair according to claim 16, further comprising a seatback having a lower seatback portion and an upper seatback portion movable with respect to one another and arranged so that the lower and upper seatback portions can overlap one another; wherein the lower seatback portion and upper seatback portion are each provided with respective telescoping lower and upper telescoping portions to enable movement therebetween; wherein a front surface of the lower seatback portion and a front surface of the upper seatback portion are arranged to provide a continuing support surface for the user's back.

18. A wheelchair according to claim 16, wherein the front stem lies rearward of the front edge of the seat base.

19. A wheelchair according to claim 16, wherein the front stem is substantially vertical during use.

20. A method of manufacturing a wheelchair according to claim 1, comprising: forming the front stem, forming the seat base and bonding the front stem to the base; the method further comprising forming a footrest and bonding the footrest to the front stem.

* * * * *